(12) United States Patent
Kurokawa

(10) Patent No.: US 10,597,064 B2
(45) Date of Patent: Mar. 24, 2020

(54) POSITION ADJUSTMENT DEVICE FOR STEERING WHEEL

(71) Applicant: NSK LTD., Tokyo (JP)

(72) Inventor: Yoshifumi Kurokawa, Maebashi (JP)

(73) Assignee: NSK LTD., Tokyo (JP)

( * ) Notice: Subject to any disclaimer, the term of this patent is extended or adjusted under 35 U.S.C. 154(b) by 84 days.

(21) Appl. No.: 15/749,570

(22) PCT Filed: Oct. 26, 2016

(86) PCT No.: PCT/JP2016/081750
§ 371 (c)(1),
(2) Date: Feb. 1, 2018

(87) PCT Pub. No.: WO2017/077919
PCT Pub. Date: May 11, 2017

(65) Prior Publication Data
US 2018/0237052 A1 Aug. 23, 2018

(30) Foreign Application Priority Data
Nov. 2, 2015 (JP) ................................ 2015-216127

(51) Int. Cl.
*B62D 1/184* (2006.01)
*B62D 1/185* (2006.01)
*B62D 1/187* (2006.01)

(52) U.S. Cl.
CPC ............. *B62D 1/184* (2013.01); *B62D 1/185* (2013.01); *B62D 1/187* (2013.01)

(58) Field of Classification Search
CPC .......... B62D 1/18; B62D 1/184; B62D 1/185; B62D 1/187
See application file for complete search history.

(56) References Cited

U.S. PATENT DOCUMENTS 4,541,298 A * 9/1985 Strutt ................. B62D 1/184
280/775
5,730,465 A * 3/1998 Barton ................ B62D 1/184
280/775

(Continued)

FOREIGN PATENT DOCUMENTS

CN 103818427 A 5/2014
CN 104097679 A 10/2014

(Continued)

OTHER PUBLICATIONS

Communication dated Jul. 24, 2018, from the European Patent Office in counterpart European Application No. 16861981.5.

(Continued)

*Primary Examiner* — Frank B Vanaman
(74) *Attorney, Agent, or Firm* — Sughrue Mion, PLLC

(57) ABSTRACT

Non-circular portions (41) are provided in two positions of an adjusting rod (17a) in an axial direction, and the non-circular portions (41) are disposed inside of telescopic-adjusting long holes (16a) of a displacement bracket (13a). Up-down-direction clearances (44a and 44b) which are present between opposite edges of each of the non-circular portions (41) in an up-down direction and inner surfaces of each of the telescopic-adjusting long holes (16a) in the up-down direction in a state where a position of a steering wheel can be maintained are less than up-down-direction clearances (43a and 43b) which are present between the opposite edges of each of the non-circular portions (41) in the up-down direction and the inner surfaces of each of the telescopic-adjusting long holes (16a) in the up-down direction in a state where the position of the steering wheel can be adjusted.

7 Claims, 10 Drawing Sheets

(56) References Cited

U.S. PATENT DOCUMENTS

| | | | | |
|---|---|---|---|---|
| 6,139,057 A | * | 10/2000 | Olgren | B62D 1/184 280/775 |
| 9,428,214 B2 | | 8/2016 | Ku | |
| 2006/0131864 A1 | * | 6/2006 | Riefe | B62D 1/185 280/775 |
| 2007/0295143 A1 | * | 12/2007 | Oh | B62D 1/184 74/493 |
| 2009/0241721 A1 | | 10/2009 | Inoue et al. | |
| 2010/0294072 A1 | | 11/2010 | Ishii et al. | |
| 2012/0312117 A1 | * | 12/2012 | Maniwa | B62D 1/184 74/493 |
| 2016/0311460 A1 | * | 10/2016 | Imagaki | B62D 1/184 |

FOREIGN PATENT DOCUMENTS

| | | |
|---|---|---|
| CN | 204077769 U | 1/2015 |
| CN | 204279597 U | 4/2015 |
| DE | 10130587 A1 | 1/2002 |
| DE | 60300313 T2 | 12/2005 |
| EP | 2402233 A2 | 1/2012 |
| JP | 1-147780 U | 10/1989 |
| JP | 2002-104203 A | 4/2002 |
| JP | 2005-239094 A | 9/2005 |
| JP | 2009-227181 A | 10/2009 |
| JP | 2009-255848 A | 11/2009 |
| JP | 2012-11837 A | 1/2012 |
| JP | 2013-47060 A | 3/2013 |
| JP | 2015-155287 A | 8/2015 |
| WO | 2009/157294 A1 | 12/2009 |

OTHER PUBLICATIONS

Search Report dated Jan. 24, 2017, issued by the International Searching Authority in counterpart International Patent Application No. PCT/JP2016/081750 (PCT/ISA/210).

Written Opinion dated Jan. 24, 2017, issued by the International Searching Authority in counterpart International Patent Application No. PCT/JP2016/081750 (PCT/ISA/237).

Communication dated Jun. 4, 2019, issued by the Japanese Patent Office in counterpart Japanese Application No. 2017-548723.

Communication dated Jun. 27, 2019 issued by the State Intellectual Property Office of P.R. China in counterpart Chinese Application No. 201680045354.5.

* cited by examiner

POSITION ADJUSTMENT DEVICE FOR STEERING WHEEL

TECHNICAL FIELD

The present invention relates to a position-adjusting device for a steering wheel, the position-adjusting device being capable of adjusting a front-rear position or an up-down position of the steering wheel for steering, for example, a vehicle.

BACKGROUND ART

A steering apparatus for a vehicle is configured as illustrated in FIG. 12. Rotation of a steering wheel 1 is transmitted to an input shaft 3 of a steering gear unit 2, a pair of left and right tie rods 4 and 4 are pushed and pulled along with the rotation of the input shaft 3, and a steering angle is applied to front wheels. The steering wheel 1 is supported and fixed to a rear end portion of the steering shaft 5, and the steering shaft 5 is supported by a cylindrical steering column 6 so as to freely rotate in a state where the steering shaft 5 penetrates the steering column 6 in an axial direction. In addition, a front end portion of the steering shaft 5 is connected to a rear end portion of an intermediate shaft 8 through a universal joint 7, and a front end portion of the intermediate shaft 8 is connected to the input shaft 3 through another universal joint 9.

In the above-described steering apparatus, in the related art, it has been considered to provide a tilt mechanism for adjusting an up-down position of the steering wheel 1 or a telescopic mechanism for adjusting a front-rear position of the steering wheel 1 according to a physique and a driving posture of a driver (for example, refer to Patent Document 1). In the structure illustrated in the drawing, in order to configure a tilt mechanism, an upper front end portion of a housing 10 fixed to a front end portion of the steering column 6 is supported so as to be pivotally displaced with respect to a vehicle body 11 using a tilt shaft 12 disposed in a width direction (the width direction refers to a width direction of the vehicle body and matches a left-right direction; the same shall be applied throughout this specification and claims). In addition, a displacement bracket 13 is provided on a lower surface in the middle of the steering column 6 in the axial direction, and a fixing bracket 14 is provided in a state where the displacement bracket 13 is held between opposite sides in the width direction. Tilt-adjusting long holes 15 which are long in an up-down direction are formed in the fixing bracket 14, and telescopic-adjusting long holes 16 which are long in the axial direction (front-rear direction) are formed in portions of the displacement bracket 13 which match portions of the tilt-adjusting long holes 15, respectively. An adjusting rod 17 is inserted in a state where it penetrates the tilt-adjusting long holes 15 and the telescopic-adjusting long holes 16 in the width direction. In addition, the steering shaft 5 and the steering column 6 are expandable according to the above-described configuration. In the above-described structure, the telescopic-adjusting long holes 16 are long in the front-rear direction. As a result, the front-rear position of the steering wheel 1 can be adjusted. By manipulating an adjusting lever (not illustrated) provided in a first end portion of the adjusting rod 17, a force with which the displacement bracket 13 is held between the opposite sides in the width direction by the fixing bracket 14 is adjusted such that the position of the steering wheel 1 can be adjusted.

A more specific structure of the steering apparatus including the position-adjusting device for a steering wheel will be described with reference to FIGS. 13 and 14.

In the steering column 6, a front portion of an outer column 18 disposed on the rear side and a rear portion of an inner column 19 disposed on the front side are slidably fitted such that the overall length of the steering column 6 is expandable. In the front portion of the outer column 18 which is formed, for example, by die-casting a light alloy, a slit 20 is provided such that the inner diameter of the front portion is elastically expandable. In addition, a pair of left and right held plate portions 21 and 21 are provided in portions where the slit 20 is held between opposite sides in the left-right direction, and the displacement bracket 13 is formed of the held plate portion 21 and 21. In addition, in the held plate portions 21 and 21, the telescopic-adjusting long holes 16 and 16 which are long in the front-rear direction are formed. In addition, a pair of left and right support plate portions 22 and 22 which are provided in the fixing bracket 14 are disposed in portions where the displacement bracket 13 is held between opposite sides in the left-right direction. In the support plate portions 22 and 22, the tilt-adjusting long holes 15 and 15, which are long in the up-down direction and have a partial arc shape centering on the tilt shaft 12 (refer to FIG. 12), are formed. The adjusting rod 17 is inserted into the tilt-adjusting long holes 15 and 15 and the telescopic-adjusting long holes 16 and 16 in the width direction.

Further, the adjusting lever 23 is provided in a first end portion of the adjusting rod 17 in the axial direction. A nut 24 is provided in a second end portion of the adjusting rod 17 in the axial direction. A thrust bearing 25 and a cam device 28 including a driving cam 26 and a driven cam 27 are provided in a first end-side portion in the middle of the of the adjusting rod 17 in the axial direction. As a result, a lock mechanism is configured in which a gap between inner surfaces of the support plate portions 22 and 22 expands or contracts based on the pivoting of the adjusting lever 23. The adjusting rod 17 having the above-described configuration can move up and down along the tilt-adjusting long holes 15 and 15, but does not rotate along with the pivoting of the adjusting lever 23.

In order to adjust the position of the steering wheel 1, the adjusting lever 23 is pivoted in a predetermined direction (in general, downward) such that the driving cam 26 rotates in an unlocking direction. The dimension of the cam device 28 in the axial direction contracts, and a gap between the driven cam 27 and the nut 24 expands. As a result, a surface pressure of a contact portion between the inner surfaces of the support plate portions 22 and 22 and outer surfaces of the held plate portions 21 and 21 is reduced or lost. Concurrently, the inner diameter of a front end portion of the outer column 18 elastically expands, and a surface pressure of a contact portion between an inner peripheral surface of the front end portion of the outer column 18 and an outer peripheral surface of a rear end portion of the inner column 19 is reduced. In this state, the up-down position and the front-rear position of the steering wheel 1 can be adjusted in a range where the adjusting rod 17 is movable in the tilt-adjusting long holes 15 and 15 and the telescopic-adjusting long holes 16 and 16.

In order to maintain the steering wheel 1 in a desired position, the steering wheel 1 is moved to the desired position, and then the adjusting lever 23 is pivoted in a reverse direction (in general, upward). As a result, the driving cam 26 rotates in a locking direction which is a rotating direction for switching the steering wheel 1 to a locked state. The dimension of the cam device 28 in the axial direction expands, and the gap between the inner surfaces of the support plate portions 22 and 22 contracts. In this state, the surface pressure of the contact portion between the inner surfaces of the support plate portions 22 and 22 and the outer surfaces of the held plate portions 21 and 21 increases. Concurrently, the inner diameter of the front end portion of the outer column 18 elastically contracts, and the surface pressure of the contact portion between the inner peripheral surface of the front end portion of the outer column 18 and the outer peripheral surface of the rear end portion of the inner column 19 increases. As a result, the steering wheel 1 can be maintained at the adjusted position.

However, in the position-adjusting device for a steering wheel having the structure of the related art with the above-described configuration, in the state (unlocked state) where the position of the steering wheel 1 can be adjusted and in the state (locked state) where the adjusted position can be maintained, up-down-direction clearances 29a and 29b exaggeratedly illustrated in FIG. 14 are present between an outer peripheral surface of the adjusting rod 17 and inner surfaces (upper and lower surfaces) of the telescopic-adjusting long holes 16 and 16. In addition, although not illustrated in the drawing, front-rear-direction clearances are present between the outer peripheral surface of the adjusting rod 17 and inner surfaces (front and rear surfaces) of the tilt-adjusting long holes 15. In a case where the up-down-direction clearance 29a and 29b and the front-rear-direction clearances are present as above, the front-rear position and the up-down position of the steering wheel 1 can be smoothly adjusted.

However, in the locked state, the outer column 18 may substantially be displaced in the front-rear direction and the up-down direction by the up-down-direction clearances 29a and 29b or the front-rear-direction clearances. Therefore, the feeling of support rigidity of the steering wheel 1 deteriorates, and a driver may feel discomfort.

RELATED ART REFERENCE

Patent Document

Patent Document 1: Japanese Unexamined Patent Application Publication No. 2009-227181

SUMMARY OF THE INVENTION

Problems to be Solved by the Invention

The present invention has been made in consideration of the above-described circumstances in order to realize a structure in which the position of a steering wheel can be smoothly adjusted in an unlocked state and in which the feeling of support rigidity of the steering wheel at least either in a front-rear direction or in an up-down direction in a locked state can be improved.

Means for Solving the Problems

A position-adjusting device for a steering wheel according to the present invention includes a steering column, a displacement bracket, a first through hole, a fixing bracket, a pair of second through holes, an adjusting rod, a pair of pressing portions, and an expanding-contracting mechanism.

The steering column is provided around a steering shaft having an end portion, to which a steering wheel is fixed, and rotatably supports the steering shaft.

The displacement bracket is fixed to a part of the steering column.

The first through hole is provided in the displacement bracket while penetrating through the displacement bracket in a width direction.

The fixing bracket includes a pair of support plate portions and is fixed to a vehicle body side, the support plate portions being provided to hold the displacement bracket between opposite sides thereof in the width direction.

The second through holes are provided in portions matching the support plate portions, respectively.

The adjusting rod is provided while being inserted into the first through hole and the second through holes in the width direction.

The pressing portions are provided in portions protruding from outer surfaces of the support plate portions in opposite end portions of the adjusting rod.

The expanding-contracting mechanism expands or contracts a gap between the pressing portions.

At least either the first through hole or each of the second through holes is an adjusting long hole that is long in a position adjusting direction in which a position of the steering wheel is adjustable. In a case where the position of the steering wheel is adjusted using a telescopic mechanism, the position adjusting direction is a front-rear direction. In a case where the position of the steering wheel is adjusted using a tilt mechanism, the position adjusting direction is an up-down direction.

Further, when the expanding-contracting mechanism expands or contracts, the adjusting rod rotates.

In particular, in the present invention, the adjusting rod has a clearance adjusting portion.

In addition, the clearance adjusting portion is disposed inside of the adjusting long hole.

In a state (locked state) where the adjusting rod is rotated such that the position of the steering wheel is maintainable, a clearance between an outer peripheral surface of the clearance adjusting portion and an inner surface of the adjusting long hole in a direction (width direction) perpendicular to the position adjusting direction is less than a clearance between the outer peripheral surface of the clearance adjusting portion and the inner surface of the adjusting long hole in the direction perpendicular to the position adjusting direction in a state (unlocked state) where the adjusting rod is rotated such that the position of the steering wheel is adjustable.

In the position-adjusting device for a steering wheel according to the present invention having the above-described configuration, specifically, a configuration in which a telescopic function for adjusting a front-rear position of the steering wheel is provided may be adopted. In a case where the above-described configuration is adopted, the first through hole is a long hole (telescopic-adjusting long hole) that is long in a front-rear direction. The adjusting long hole is the first through hole.

In the position-adjusting device for a steering wheel according to the present invention having the above-described configuration, specifically, a configuration in which a tilt function for adjusting an up-down position of the steering wheel is provided may be adopted. In a case where the above-described configuration is adopted, each of the second through holes is a long hole (tilt-adjusting long hole) that is long in an up-down direction. The adjusting long hole is each of the second through holes.

In the position-adjusting device for a steering wheel according to the present invention having the above-described configuration, specifically, the clearance adjusting portion may be formed of a non-circular portion having a non-circular shape in cross-section.

In addition, in order to practice the present invention, for example, the non-circular portion is formed of a resin portion that is externally fitted and fixed to an outer peripheral surface of the adjusting rod.

In addition, in order to practice the present invention, for example, in the state where the position of the steering wheel is maintainable, in a cross-sectional shape of an outer peripheral surface of the non-circular portion on a virtual plane perpendicular to an axial direction of the adjusting rod, a dimension in the position adjusting direction is less than a dimension in the direction perpendicular to the position adjusting direction.

In addition, in order to practice the present invention, for example, the cross-sectional shape of the outer peripheral surface of the non-circular portion on the virtual plane perpendicular to the axial direction of the adjusting rod is elliptical (or oblong).

In addition, in order to practice the present invention, for example, a protrusion that protrudes radially outward is formed in the middle of the adjusting rod in the axial direction. A portion of the adjusting rod that matches the protrusion in the axial direction is the non-circular portion. In a case where the above-described configuration is adopted, specifically, a cross-sectional shape of an outer peripheral surface of the protrusion on a virtual plane perpendicular to a central axis of the adjusting rod may be an arc shape having a central axis that is eccentric to the central axis of the adjusting rod.

In addition, in the position-adjusting device for a steering wheel according to the present invention having the above-described configuration, specifically, the clearance adjusting portion may be formed of a crank portion including an eccentric shaft portion that is eccentric to a rotation center of the adjusting rod.

Advantages of the Invention

With the position-adjusting device for a steering wheel according to the present invention having the above-described configuration, the position of a steering wheel can be adjusted in the unlocked state, and the feeling of support rigidity of the steering wheel in the locked state can be improved.

That is, in the present invention, the clearance between the outer peripheral surface of the clearance adjusting portion and the inner surface of the adjusting long hole in the direction perpendicular to the position adjusting direction in the locked state is set to be less than that in the unlocked state. Therefore, in the unlocked state, the adjusting rod can be smoothly displaced in the position adjusting direction in the adjusting long hole based on the presence of the clearance between the outer peripheral surface of the adjusting rod and the inner surface of the adjusting long hole in the direction perpendicular to the position adjusting direction. On the other hand, in the locked state, the clearance is less than that in the unlocked state. Therefore, the distance in which the adjusting rod is displaced in the adjusting long hole in the direction perpendicular to the position adjusting direction can be reduced. As a result, the feeling of support rigidity of the steering wheel is improved, and discomfort felt by a driver can be reduced (or eliminated).

BRIEF DESCRIPTION OF THE DRAWINGS

FIGS. 1A and 1B are diagrams illustrating a first embodiment of the present invention and corresponding to FIG. 14, wherein FIG. 1A illustrates an unlocked state and FIG. 1B illustrates a locked state.

FIGS. 2A and 2B are diagrams illustrating a disposition relationship between an outer peripheral surface of a non-circular portion of an adjusting rod and a telescopic-adjusting long hole in the first embodiment, wherein FIG. 2A illustrates the unlocked state and FIG. 2B illustrates the locked state.

MODES FOR CARRYING OUT THE INVENTION

First Embodiment

Figure 12:
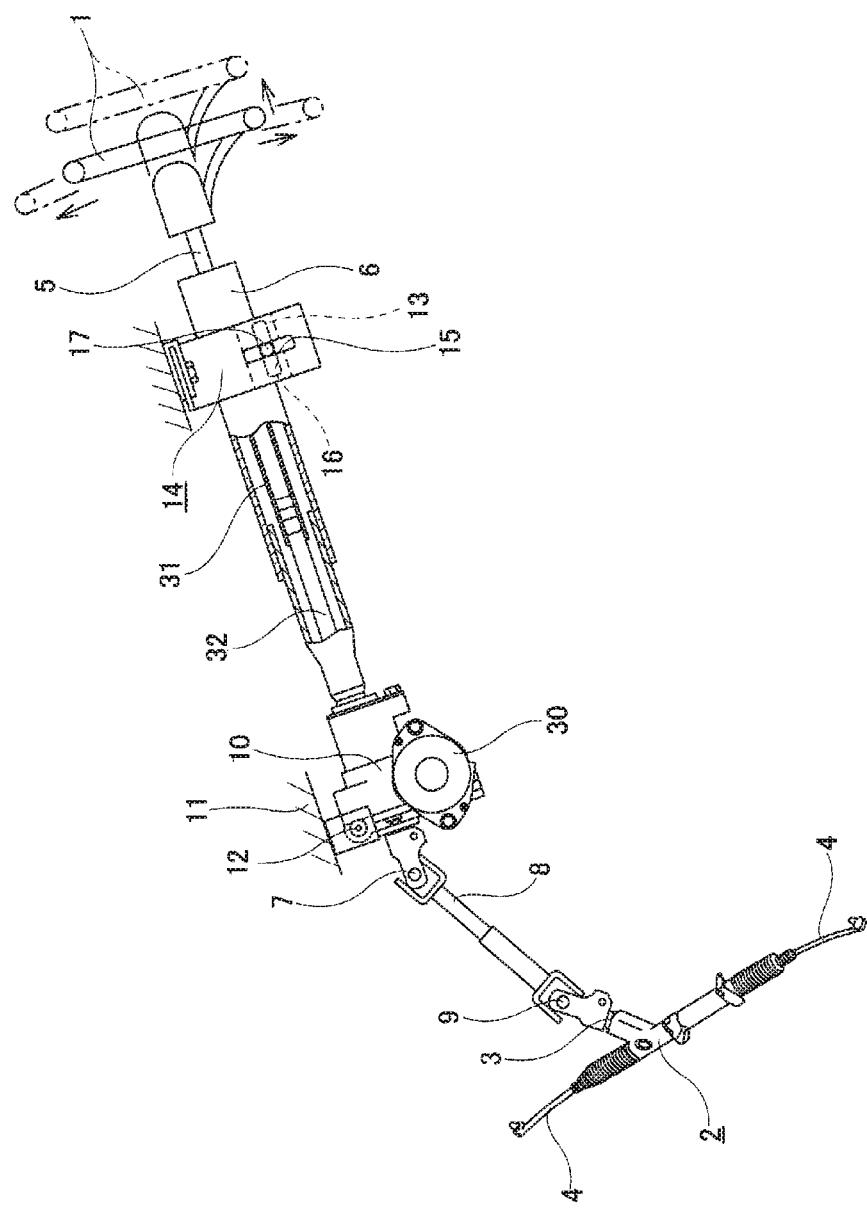
FIG. 12 is a partial side view illustrating an example of a steering apparatus to which the present invention is applied.
Figure 13:
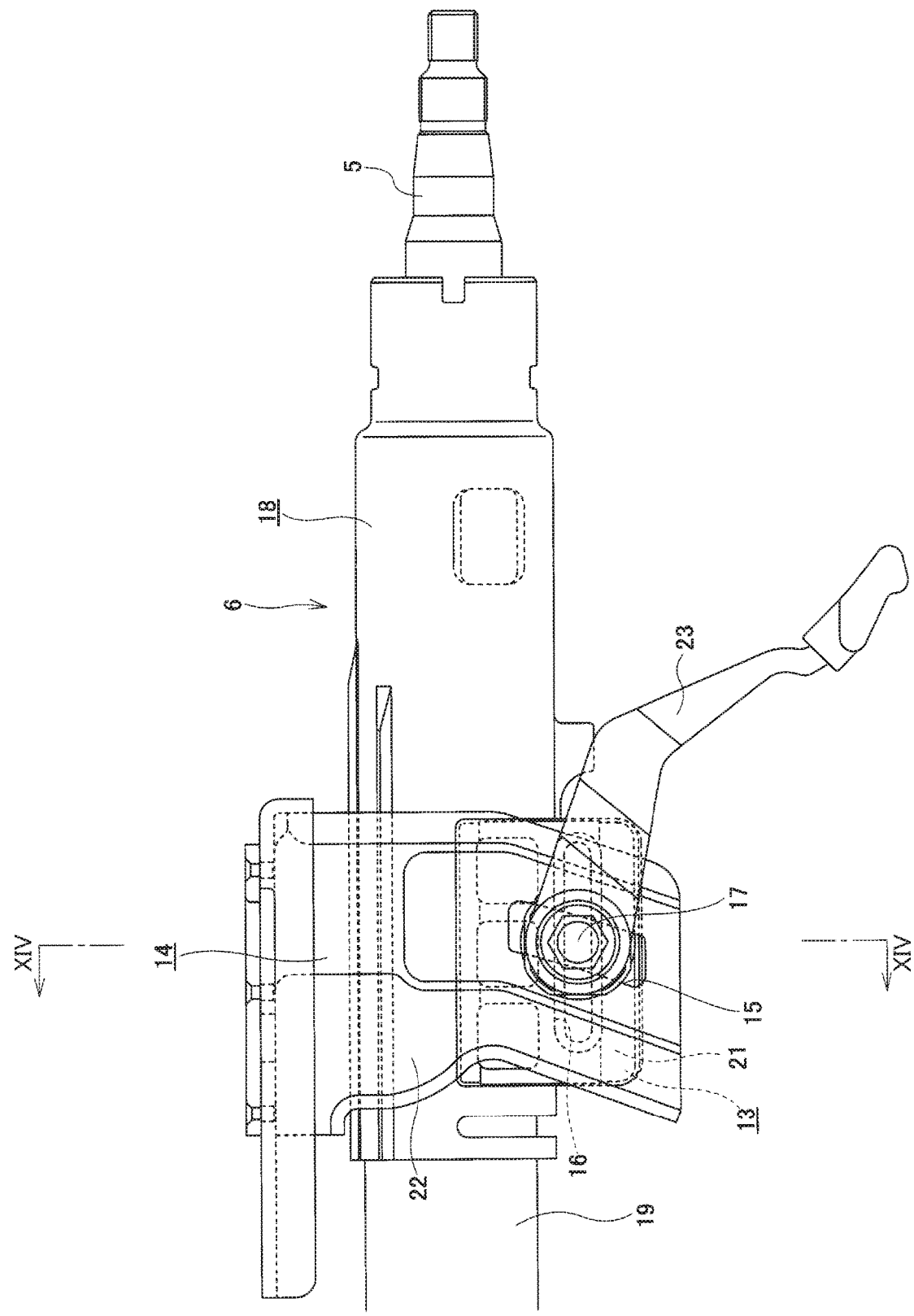
FIG. 13 is a partial side view illustrating a specific structure of a position-adjusting device for a steering wheel.
Figure 14:
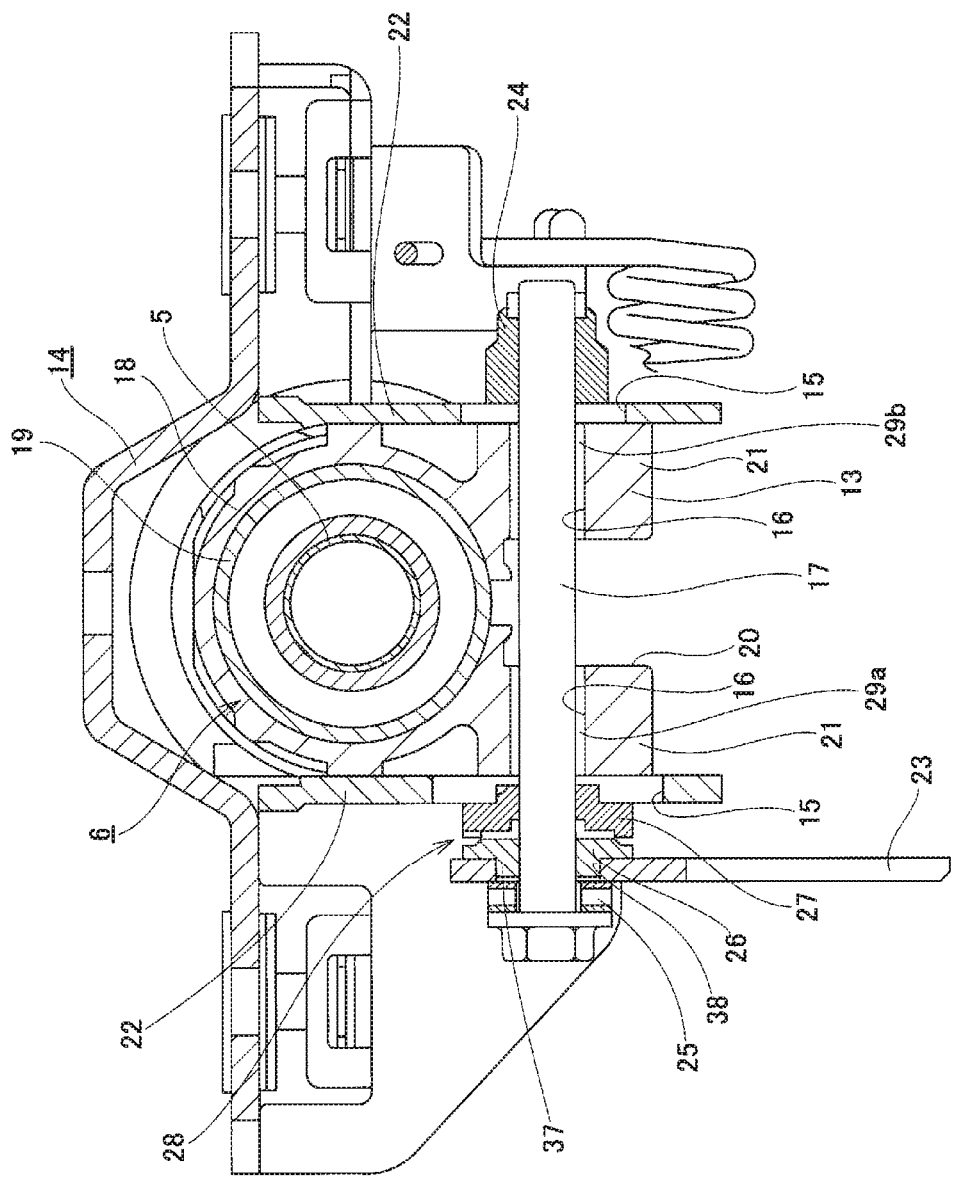
FIG. 14 is a cross-sectional view taken along line XIV-XIV of FIG. 13.

A first embodiment of the present invention will be described with reference to FIGS. 1A to 2B. A steering apparatus to which a position-adjusting device for a steering wheel according to the embodiment is applied has substantially the same structure as that of a steering apparatus illustrated in FIG. 12. Hereinafter, a basic configuration of the steering apparatus according to the embodiment will be simply described with reference to FIG. 12, and then a structure of a characteristic portion of the embodiment will be described.

In the steering apparatus according to the embodiment, rotation of a steering wheel 1 (refer to FIG. 12) is transmitted to an input shaft 3 of a steering gear unit 2, a pair of left and right tie rods 4 and 4 are pushed and pulled along with the rotation of the input shaft 3 through a rack-and-pinion mechanism, and a steering angle is applied to wheels.

The steering wheel 1 is supported and fixed to a rear end portion of the steering shaft 5, and the steering shaft 5 is supported by a cylindrical steering column 6 (6*a*) so as to freely rotate in a state where the steering shaft 5 penetrates the steering column 6 (6*a*) in an axial direction. In addition, a front end portion of the steering shaft 5 is connected to a rear end portion of an intermediate shaft 8 through a universal joint 7, and a front end portion of the intermediate shaft 8 is connected to the input shaft 3 through another universal joint 9. In addition, in order to apply a steering assist force to the steering shaft 5, an electric motor 30 as a power source is provided in front of the steering column 6.

Figure 1A:
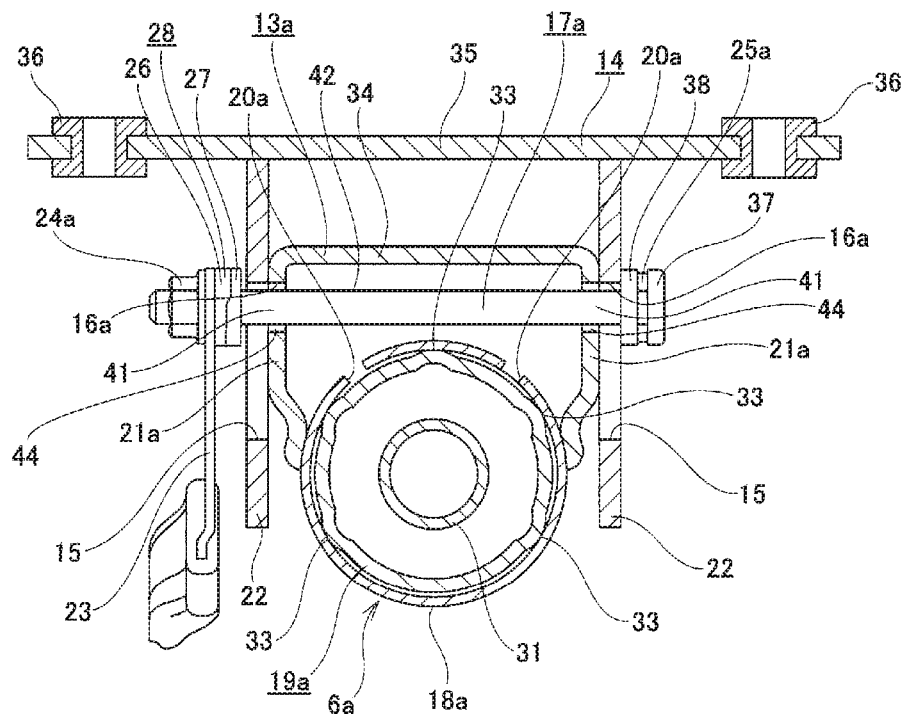
Figure 1B:
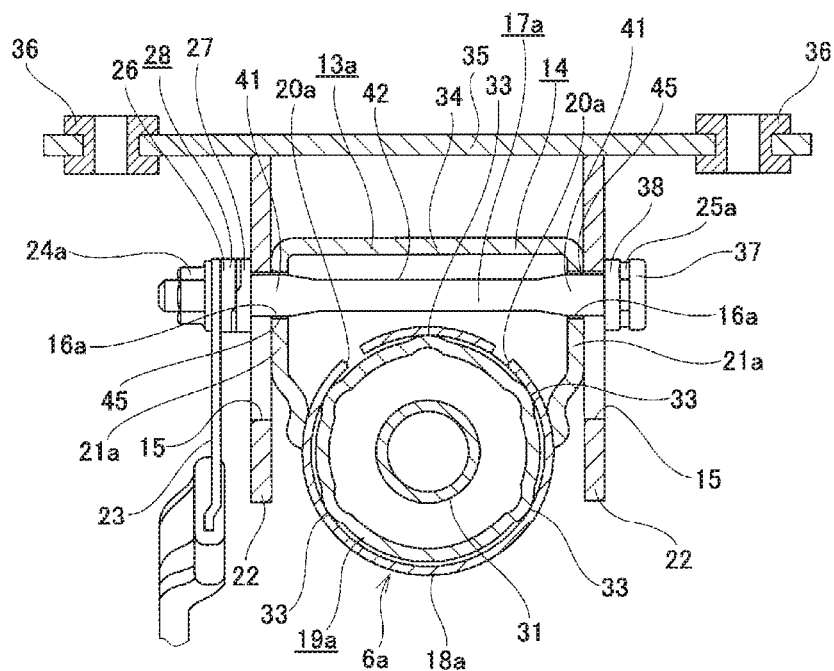

A specific structure of the steering apparatus according to the embodiment will be described with reference to FIGS. 1A and 1B. The steering shaft 5 having a rear end portion to which the steering wheel 1 is fixed can adjust a front-rear position of an outer shaft 31 by spline-fitting a front end portion of the outer shaft 31 provided on the rear side (right side in FIG. 12) and a rear end portion of an inner shaft 32 provided on the front side (left side in FIG. 12). In the steering column 6*a* in which an outer column 18*a* and an inner column 19*a* are combined in a telescopic (expandable and contractible) manner, the steering shaft 5 having the above-described configuration is supported to be rotatable only by, for example, a single row deep groove ball bearing (not illustrated). In the embodiment, in an outer peripheral surface of the inner column 19*a*, protrusion portions 33 and 33 protruding radially outward are formed at plural circumferential positions (in the embodiment, five positions) of a portion in a circumferential direction that is fitted to an inner peripheral surface of the outer column 18*a*.

A housing 10 (refer to FIG. 12) is fixed to a front end portion of the steering column 6*a* (inner column 19*a*). An upper front end portion of the housing 10 is supported so as to pivot about a tilt shaft 12 with respect to a vehicle body (not illustrated) in an up-down direction, the tilt shaft 12 being disposed in a width direction. In addition, in the housing 10, for example, a worm reducer (not illustrated), which configures an electric assist mechanism, including a worm and a worm wheel is disposed. Based on a torque working on the inner shaft 32, the worm is rotated by the electric motor 30 fixed to the housing 10. As a result, a steering assist force is applied to the steering shaft 5.

With the above-described configuration, an up-down position of the steering wheel 1 can be adjusted based on the pivoting displacement about the tilt shaft 12, and a front-rear position of the steering wheel 1 can be adjusted based on the expansion or contraction of the steering shaft 5 and the steering column 6*a*. In order to maintain the steering wheel 1 at the adjusted position, a displacement bracket 13*a* having a substantially U-shape in cross-section is bonded and fixed to an upper portion of the steering column 6*a* by welding, and a fixing bracket 14 is supported on the vehicle body side. Specifically, the displacement bracket 13*a* is a plate-shaped member disposed in the up-down direction, and includes a pair of held plate portions 21*a* and 21*a* having a lower end portion that is welded to an outer peripheral surface of the steering column 6*a*; and a bottom portion 34 in which upper edges of the held plate portions 21*a* and 21*a* continuously extend in the width direction. In addition, in the held plate portions 21*a* and 21*a*, telescopic-adjusting long holes 16*a* and 16*a* which are long in the front-rear direction are formed. In addition, in the outer column 18*a*, a pair of slits 20*a* and 20*a* which are long in the front-rear direction are provided in two positions of an upper end portion of a front portion which are distant from each other in a circumferential direction such that the inner diameter of the front portion is elastically expandable. The slits 20*a* and 20*a* are held between opposite sides in the left-right direction by the held plate portions 21*a* and 21*a*.

In addition, the fixing bracket 14 is provided in a state where the displacement bracket 13*a* is held between opposite sides in the width direction. The fixing bracket 14 includes: a mounting plate portion 35 that is provided in the upper portion; and a pair of left and right support plate portions 22 and 22 hanging downward from the mounting plate portion 35. The fixing bracket 14 is supported by the mounting plate portion 35 through a pair of release capsules 36 and 36 with respect to the vehicle body so as to be released to the front side upon a secondary collision. Specifically, a pair of notch grooves having an opening at a rear edge are formed in opposite end portions of the mounting plate portion 35 in the width direction, and the release capsules 36 and 36 fixed to the vehicle body engage with the notch grooves, respectively through a bonding member (not illustrated). In the support plate portions 22 and 22, a pair of tilt-adjusting long holes 15 and 15, which are long in the up-down direction and have a partial arc shape centering on the tilt shaft 12, are formed. The tilt-adjusting long holes 15 and 15 may be formed to have a rectangular shape which is long in the up-down direction instead of the partial arc shape.

The adjusting rod 17*a* is inserted into the tilt-adjusting long holes 15 and 15 and the telescopic-adjusting long holes 16*a* and 16*a* in the width direction. In the embodiment, in a space between a head portion 37, which is formed in a second end portion (right end portion in FIGS. 1A and 1B) of the adjusting rod 17*a* in the axial direction, and the second support plate portion 22 (right support plate portion in FIGS. 1A and 1B), a pressing plate 38 and a thrust bearing 25*a* are disposed in order from the second support plate portion 22.

On the other hand, in a space between a nut 24*a* screwed into a male screw portion, which is formed in a first end portion (left end portion in FIGS. 1A and 1B) of the adjusting rod 17*a* in the axial direction, and the first support plate portion 22 (left support plate portion in FIGS. 1A and 1B), a driven cam 27, a driving cam 26, and an adjusting lever 23 are disposed in order from the first support plate portion 22.

In the embodiment, the pressing plate 38 and the driven cam 27 correspond to a pressing portion of the present invention.

The driven cam 27 and the driving cam 26 constitute a cam device 28 corresponding to an expanding-contracting mechanism of the present invention. In addition, the driven cam 27 is formed of sintered metal, has a center hole (not illustrated) into which the adjusting rod 17*a* is inserted, and has a substantially rectangular shape as a whole. In addition, in an outer surface (left surface in FIGS. 1A and 1B) of the driven cam 27, a driven cam surface, which is a corrugated surface in a circumferential direction, is formed. The driven cam 27 having the above-described configuration is externally fitted so as to rotate relative to the adjusting rod 17*a* in a state where a first end-side portion of the adjusting rod 17*a* in the axial direction is inserted into the center hole.

In an inner surface of the driven cam 27, an engagement protrusion (not illustrated) protruding inward in the width direction is provided. By engaging the engagement protrusion with the tilt-adjusting long hole 15 formed in the first support plate portion 22, the driven cam 27 is prevented from rotating relative to the first support plate portion 22.

On the other hand, the driving cam 26 is formed of sintered metal, has a center hole (not illustrated) into which the adjusting rod 17a is inserted (inserted loosely not to be press-fitted), and has a substantially annular disk shape as a whole. In addition, in an inner surface (right surface in FIGS. 1A and 1B) of the driving cam 26, a driving cam surface, which is a corrugated surface in a circumferential direction, is formed. In addition, in an outer surface of the driving cam 26, a driving engagement protrusion (not illustrated) protruding outward from the outer surface in the width direction is provided. The driving cam 26 having the above-described configuration is assembled into the adjusting rod 17a in a state where an outer peripheral surface of the first end-side portion of the adjusting rod 17a in the axial direction is fitted into the center hole. In addition, in this state, the driving engagement protrusion is engaged with an engagement recession (not illustrated) provided in a base end portion of the adjusting lever 23. This way, the driving cam 26 can rotate together with the adjusting lever 23.

In addition, in the embodiment, the base end portion of the adjusting lever 23 is bonded and fixed to the first end portion of the adjusting rod 17a in the axial direction in a state where the adjusting lever 23 and the adjusting rod 17a can rotate together.

Figure 2A:
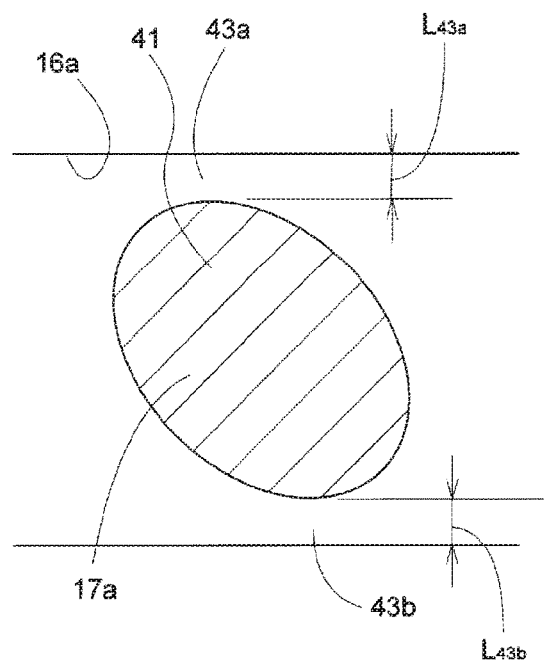
Figure 2B:
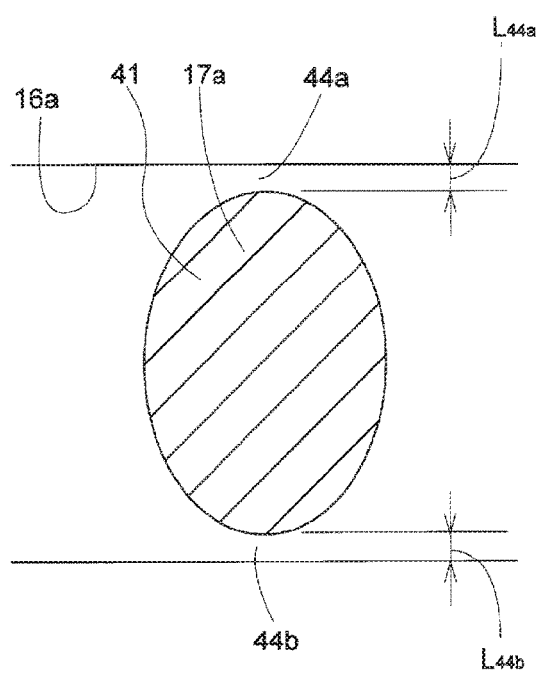

In particular, in the embodiment, a pair of non-circular portions 41 and 41, which correspond to a clearance adjusting portion of the present invention and have an elliptical shape in cross-section illustrated in FIGS. 2A and 2B, are provided in two positions which are the opposite end-side portions of the adjusting rod 17a in the axial direction. Specifically, the adjusting rod 17a includes: the male screw portion (not illustrated) that is formed in an outer peripheral surface of the first end portion in the axial direction; the first non-circular portion 41 that is provided closer to the second side in the axial direction than the male screw portion; a cylindrical surface portion 42 that is provided in an outer peripheral surface of the first non-circular portion 41 on the second side in the axial direction; the second non-circular portion 41 that is provided in a portion of the cylindrical surface portion 42 on the second side in the axial direction; and the head portion 37 that is provided in the second end portion in the axial direction. In the embodiment, the non-circular portions 41 and 41 are disposed inside of the telescopic-adjusting long holes 16a and 16a of the held plate portions 21a and 21a. A configuration in which only one of the non-circular portions 41 and 41 is provided may be adopted.

Specifically, in a state (unlocked state) where the position of the steering wheel 1 can be adjusted, the adjusting rod 17a is disposed such that a major axis direction of the non-circular portions 41 and 41 matches a specific direction, the specific direction being inclined by 45° from a direction in which the telescopic-adjusting long holes 16a and 16a are disposed (the left-right direction in the FIGS. 2A and 2B, the front-rear direction of the vehicle body, a position adjusting direction of the present invention) toward a rotating direction of the driving cam 26 (clockwise direction in FIGS. 2A and 2B) during transition from the unlocked state to a state (locked state) where the position of the steering wheel 1 can be maintained. In this state, a protrusion constituting the driving cam surface of the driving cam 26 faces a recession constituting the driven cam surface of the driven cam 27 in the axial direction, and the dimension of the cam device 28 in the axial direction contracts.

Figure 3A:
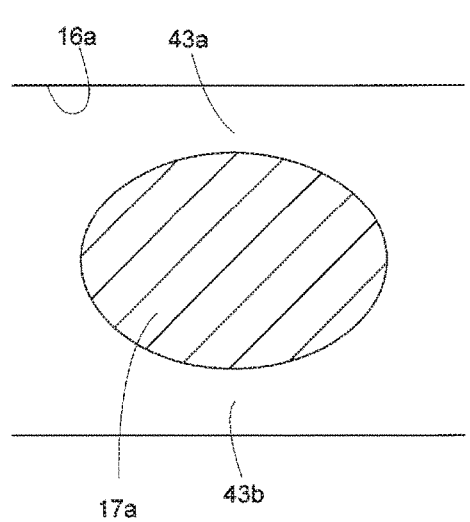
FIGS. 3A and 3B are diagrams illustrating another example of the relationship between the non-circular portion and the telescopic-adjusting long hole in the first embodiment and corresponding to FIGS. 2A and 2B.
Figure 3B:
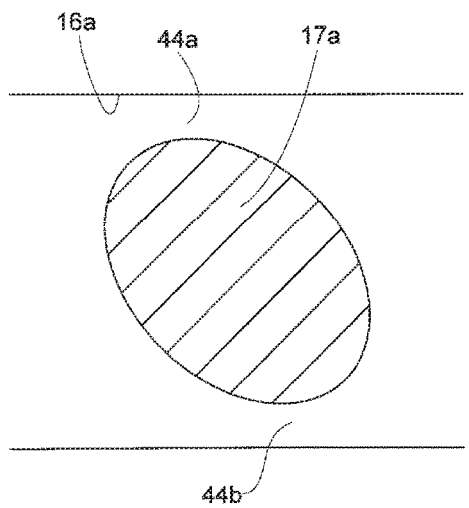

In addition, in the embodiment, in the locked state, the cam device 28 is configured (the displacement of the driving cam 26 relative to the driven cam 27 is restricted) and the adjusting rod 17a is disposed such that a longitudinal direction of the non-circular portions 41 and 41 matches a direction perpendicular to the direction in which the telescopic-adjusting long holes 16a and 16a are disposed. That is, the driving cam 26 and the adjusting rod 17a rotate by 45° about the central axes thereof, respectively, along with the pivoting (rotation) of the adjusting lever 23 during the transition from the unlocked state to the locked state. As a result, each protrusion constituting the driving cam surface of the driving cam 26 runs onto (faces) each protrusion constituting the driven cam surface of the driven cam 27, and the dimension of the cam device 28 in the axial direction expands. In addition, along with the rotation of the adjusting rod 17a, in the telescopic-adjusting long holes 16a and 16a, the non-circular portions 41 and 41 are transitioned from a state illustrated in FIG. 2A to a state in FIG. 2B (rotates about 45° in the clockwise direction in FIGS. 2A and 2B). In the unlocked state and the locked state, the position relationship between the non-circular portions 41 and 41 and the telescopic-adjusting long holes 16a and 16a is not limited to the configuration illustrated in FIGS. 2A and 2B and, for example, may be a configuration illustrated in FIGS. 3A and 3B.

In addition, in the unlocked state illustrated in FIG. 2A, a pair of up-down-direction clearances 43a and 43b having dimensions of L$43_a$ and L$43_b$ are present between upper and lower edges of each of the outer peripheral surfaces of the non-circular portions 41 and 41 and upper and lower surfaces of each of the telescopic-adjusting long holes 16a and 16a. In the embodiment, the dimensions of the up-down-direction clearances 43a and 43b are the same ($L_{43a}=L_{43b}$). The dimensions of the up-down-direction clearances 43a and 43b may be different from each other. The up-down-direction clearances having the above-described configuration are appropriately set in consideration of a relationship with the structure of the position-adjusting device for a steering wheel.

In the locked state illustrated in FIG. 2B, a pair of up-down-direction clearances 44a and 44b having dimensions of L$44_a$ and L$44_b$ are present between the upper and lower edges (opposite edges in the major axis direction) of each of the outer peripheral surfaces of the non-circular portions 41 and 41 and the upper and lower surfaces of each of the telescopic-adjusting long holes 16a and 16a.

$L_{44a}+L_{44b}$, which is the sum of the dimensions of the up-down-direction clearances 44a and 44b in the locked state, is less than $L_{43a}+L_{43b}$ which is the sum of the dimensions of the up-down-direction clearances 43a and 43b in the unlocked state ($L_{44a}+L_{44b}<L_{43a}+L_{43b}$).

In the embodiment, even in the locked state, the up-down-direction clearances 44a and 44b having the above-described configuration are present ($L_{44a}>0$, $L_{44b}>0$). However, a configuration in which the dimensions of the up-down-direction clearances 44a and 44b are zero may also be adopted. That is, in the locked state, a configuration in which the upper and lower edges of the outer peripheral surfaces of the non-circular portions 41 and 41 are in contact with the upper and lower surfaces of the telescopic-adjusting long holes 16a and 16a may also be adopted.

In the position-adjusting device for a steering wheel according to the embodiment having the above-described configuration, the front-rear position of a steering wheel can be smoothly adjusted in an unlocked state and the feeling of support rigidity of the steering wheel in the up-down direction in the locked state can be improved.

That is, in the embodiment, the sum ($L_{43a}+L_{43b}$) of the dimensions of the up-down-direction clearances 44a and 44b, which are present between the upper and lower edges of each of the outer peripheral surfaces of the non-circular portions 41 and 41 and the upper and lower surfaces of each of the telescopic-adjusting long holes 16a and 16a in the locked state, is less than the sum ($L_{44a}+L_{44b}$) of the up-down-direction clearances 43a and 43b in the unlocked state ($L_{44a}+L_{44b}<L_{43a}+L_{43b}$). Therefore, in the unlocked state, the adjusting rod 17a can be smoothly displaced in the front-rear direction in the telescopic-adjusting long holes 16a and 16a based on the presence of the up-down-direction clearances 43a and 43b. On the other hand, in the locked state, the up-down-direction clearances 44a and 44b are smaller than the up-down-direction clearances 43a and 43b. Therefore, the distance in which the adjusting rod 17a can be displaced in the up-down direction in the telescopic-adjusting long holes 16a and 16a can be reduced. As a result, the feeling of support rigidity of the steering wheel 1 is improved, and discomfort felt by a driver can be reduced (or eliminated).

The non-circular portions 41 and 41 only has to be provided at least in the range of the telescopic-adjusting long holes 16a and 16a in the axial direction of the adjusting rod 17a. From the viewpoint of workability, as illustrated in FIG. 1B, it is preferable that the non-circular portions 41 and 41 be provided at least in the range of the telescopic-adjusting long holes 16a and 16a and the tilt-adjusting long holes 15 and 15.

Second Embodiment

A second embodiment of the present invention will be described with reference to FIGS. 4A and 4B. A basic configuration of a steering apparatus to which the position-adjusting device for a steering wheel according to the embodiment is applied is substantially the same as that of the steering apparatus having the structure of the related art and the steering apparatus according to the first embodiment. A specific structure of the steering apparatus according to the embodiment will be described with reference to FIGS. 4A and 4B.

As in the above-described structure of the related art, in the steering column 6, a front portion of an outer column 18 disposed on the rear side and a rear portion of an inner column 19 disposed on the front side are slidably fitted such that the overall length of the steering column 6 is expandable. In the front portion of the outer column 18 which is formed, for example, by die-casting a light alloy such as an aluminum alloy, a slit 20 is provided such that the inner diameter of the front portion is elastically expandable. In addition, a pair of left and right held plate portions 21 and 21 are provided in portions where the slit 20 is held between opposite sides in the left-right direction, and the displacement bracket 13 is formed of the held plate portion 21 and 21. In addition, in the held plate portions 21 and 21, the telescopic-adjusting long holes 16 and 16 which are long in the front-rear direction are formed. In addition, a pair of left and right support plate portions 22 and 22 which are provided in the fixing bracket 14 are disposed in portions where the displacement bracket 13 is held between opposite sides in the left-right direction. In the support plate portions 22 and 22, the tilt-adjusting long holes 15 and 15, which are long in the up-down direction and have a partial arc shape centering on the tilt shaft 12 (refer to FIG. 12), are formed.

An adjusting rod 17b is inserted into the tilt-adjusting long holes 15 and 15 and the telescopic-adjusting long holes 16 and 16 in the width direction. The tilt-adjusting long holes 15 and 15 may be formed to have a rectangular shape which is long in the up-down direction instead of the partial arc shape.

In the embodiment, in a space between a nut 24b screwed into a male screw portion 46, which is formed in a first end portion of the adjusting rod 17b in the axial direction, and the first support plate portion 22 (left support plate portion in FIGS. 4A and 4B), a pressing plate 38a and a thrust bearing 25b are disposed in order from the first support plate portion 22.

On the other hand, in a space between a head portion 37a, which is formed in the second end portion of the adjusting rod 17b in the axial direction, and the second support plate portion 22 (right support plate portion in FIGS. 4A and 4B), a driven cam 27a, a driving cam 26a, and an adjusting lever 23 are disposed in order from the second support plate portion 22.

In the embodiment, the pressing plate 38a and the driven cam 27a correspond to the pressing portion of the present invention.

The driven cam 27a and the driving cam 26a constitute a cam device 28a corresponding to the expanding-contracting mechanism of the present invention. In addition, the driven cam 27a is formed of sintered metal, has a center hole (not illustrated) into which the adjusting rod 17b is inserted, and has a substantially rectangular shape as a whole. In addition, in an outer surface (right surface in FIGS. 4A and 4B) of the driven cam 27a, a driven cam surface, which is a corrugated surface in a circumferential direction, is formed. On the other hand, in an inner surface of the driven cam 27a, an engagement protrusion 39 protruding inward in the width direction is formed. The driven cam 27a having the above-described configuration is externally fitted so as to rotate relative to the adjusting rod 17b in a state where a second end-side portion of the adjusting rod 17b in the axial direction is inserted into the center hole. In addition, in this state, the engagement protrusion 39 of the driven cam 27a is disposed in the tilt-adjusting long hole 15 formed in the second support plate portion 22. This way, the rotation of the driven cam 27a relative to the second support plate portion 22 is restricted.

On the other hand, the driving cam 26a is formed of sintered metal, has a center hole (not illustrated) into which the adjusting rod 17b is inserted (inserted loosely not to be press-fitted), and has a substantially annular disk shape as a whole. In addition, in an inner surface (left surface in FIGS. 4A and 4B) of the driving cam 26a, a driving cam surface, which is a corrugated surface in a circumferential direction, is formed. In addition, in an outer surface of the driving cam 26a, a driving engagement protrusion 40 protruding outward from the outer surface in the width direction is provided. The driving cam 26a having the above-described configuration is assembled into the adjusting rod 17b in a state where an outer peripheral surface of the second end-side portion of the adjusting rod 17b in the axial direction is fitted into the center hole. In addition, in this state, the driving engagement protrusion 40 is engaged with an engagement recession (not illustrated) provided in a base end portion of the adjusting lever 23. This way, the driving cam 26a can rotate together with the adjusting lever 23.

In addition, in the embodiment, the base end portion of the adjusting lever 23 is bonded and fixed to the second end portion of the adjusting rod 17b in the axial direction in a state where the adjusting lever 23 and the adjusting rod 17b can rotate together.

Further, in the embodiment, in order to assist a manipulation of adjusting the position of the steering wheel 1 (refer to FIG. 12) in the up-down direction, the outer column 18 (displacement bracket 13) is biased upward using a spring 59.

In addition, in the embodiment, a pair of crank portions 45a and 45b corresponding to the clearance adjusting portion of the present invention are provided in two positions in the middle of the adjusting rod 17b in the axial direction. Specifically, the adjusting rod 17b includes the male screw portion 46, a first shaft portion 47, a first continuously inclined portion 48, an eccentric shaft portion 49, a second continuously inclined portion 50, a second shaft portion 51, and the head portion 37a in order from the first end in the axial direction.

The male screw portion 46 is formed in an outer peripheral surface of the first end portion of the adjusting rod 17b in the axial direction.

The first shaft portion 47 has a circular shape in cross-section, and a first edge thereof in the axial direction is connected to a second edge of the male screw portion 46 in the axial direction.

The first continuously inclined portion 48 is provided so as to be inclined in a direction away from the first shaft portion 47 toward the second side in the axial direction. A first edge of the first continuously inclined portion 48 in the axial direction is connected to a second edge of the first shaft portion 47 in the axial direction.

The eccentric shaft portion 49 has a circular shape in cross-section and is provided such that a central axis thereof is eccentric to a central axis of the first shaft portion 47. A first edge of the eccentric shaft portion 49 in the axial direction is connected to a second edge of the first continuously inclined portion 48 in the axial direction.

The second continuously inclined portion 50 is provided so as to be inclined in a direction away from the eccentric shaft portion 49 toward the second side in the axial direction. A first edge of the second continuously inclined portion 50 in the axial direction is connected to a second edge of the eccentric shaft portion 49 in the axial direction.

The second shaft portion 51 has a circular shape in cross-section and is provided coaxially with the first shaft portion 47. A first edge of the second shaft portion 51 in the axial direction is connected to a second edge of the second continuously inclined portion 50 in the axial direction.

The head portion 37a is provided such that a first surface thereof in the axial direction is connected to a second edge of the second shaft portion 51 in the axial direction.

In the embodiment, a second end-side portion of the first shaft portion 47 in the axial direction, the first continuously inclined portion 48, and a first end-side portion of the eccentric shaft portion 49 in the axial direction constitute the first crank portion 45a.

On the other hand, a second end-side portion of the eccentric shaft portion 49 in the axial direction, the second continuously inclined portion 50, and a first end-side portion of the second shaft portion 51 in the axial direction constitute the second crank portion 45b. In the embodiment, the crank portions 45a and 45b are disposed inside of the telescopic-adjusting long holes 16 and 16 of the held plate portions 21 and 21.

Specifically, in a state (unlocked state) where the position of the steering wheel 1 can be adjusted, the adjusting rod 17b is disposed such that an eccentric direction of the first shaft portion 47 and the second shaft portion 51 of the eccentric shaft portion 49, which constitute the crank portions 45a and 45b, matches a specific direction, the specific direction being inclined by 45° from a direction in which the telescopic-adjusting long holes 16a and 16a are disposed (the front-rear direction, the position adjusting direction of the present invention) toward a rotating direction of the driving cam 26a during transition from the unlocked state to a state (locked state) where the position of the steering wheel 1 can be maintained. In addition, in the embodiment, in the locked state, the cam device 28a is configured (the displacement of the driving cam 26a relative to the driven cam 27a is restricted) and an adjusting rod 17i is disposed such that the eccentric shaft portion 49 constituting the crank portions 45a and 45b matches a direction (up-down direction) perpendicular to the direction in which the telescopic-adjusting long holes 16 and 16 are disposed. That is, the driving cam 26a and the adjusting rod 17b rotate by 45° about the central axes thereof (the central axes of the first shaft portion and the second shaft portion), respectively, along with the pivoting (rotation) of the adjusting lever 23 during the transition from the unlocked state to the locked state. As a result, a protrusion constituting the driving cam surface of the driving cam 26a runs onto (faces) a protrusion constituting the driven cam surface of the driven cam 27a, and the dimension of the cam device 28a in the axial direction expands. In addition, along with the rotation of the adjusting rod 17b, in the telescopic-adjusting long holes 16a and 16a, the eccentric shaft portion 49 constituting the crank portions 45a and 45b is transitioned (rotates) from a state illustrated in FIG. 4A to a state in FIG. 4B.

Figure 4A:
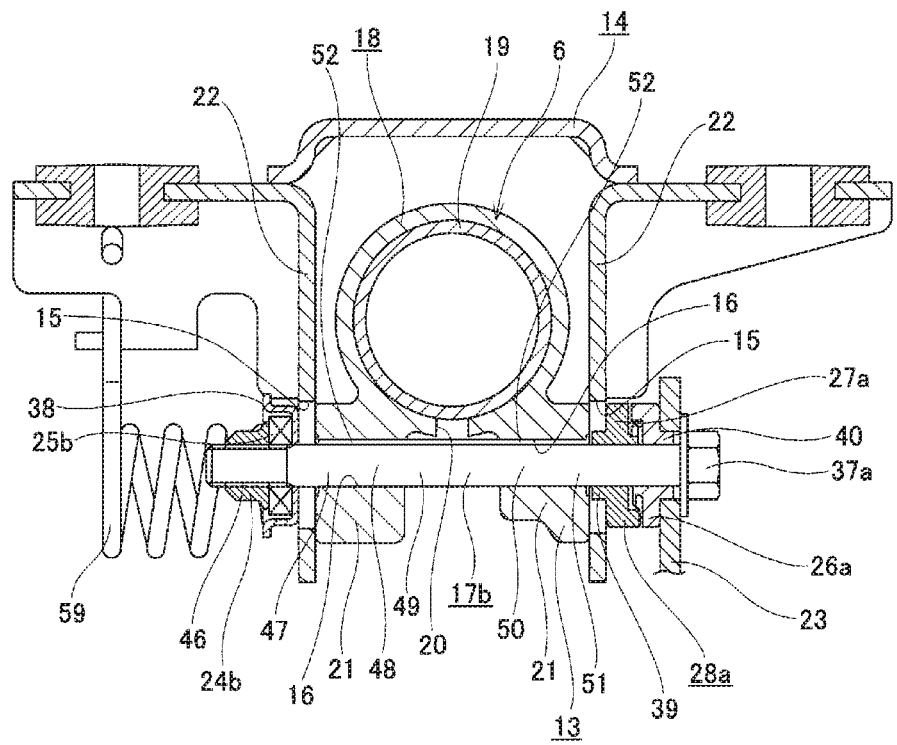
FIGS. 4A and 4B are diagrams illustrating a second embodiment of the present invention and corresponding to FIGS. 1A and 1B.

In addition, in the unlocked state illustrated in FIG. 4A, up-down-direction clearances 52 and 52 are present between upper edges of outer peripheral surfaces of the crank portions 45a and 45b, and upper surfaces of the telescopic-adjusting long holes 16a and 16a. In the embodiment, as described above, the outer column 18 (displacement bracket 13) is biased upward using the spring 59. Therefore, in the unlocked state illustrated in FIG. 4A, no clearances are present between lower edges of outer peripheral surfaces of the crank portions 45a and 45b, and lower surfaces of the telescopic-adjusting long holes 16a and 16a.

Figure 4B:
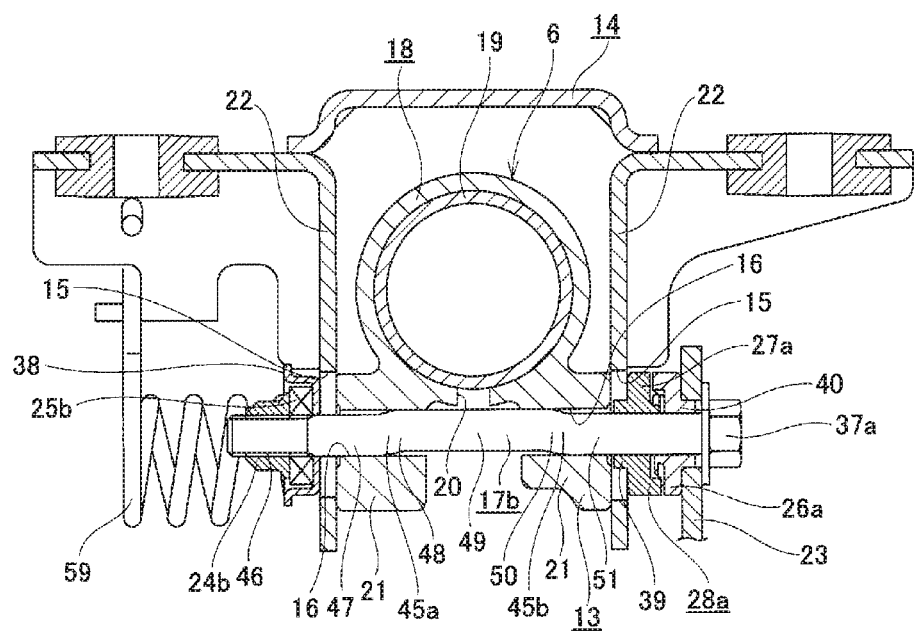

On the other hand, in the locked state illustrated in FIG. 4B, no clearances are present between the upper edges of the outer peripheral surfaces of the crank portions 45a and 45b (the upper edge of the eccentric shaft portion 49), and the upper surfaces of the telescopic-adjusting long holes 16a and 16a. In other words, in the locked state illustrated in FIG. 4B, the upper edges of the outer peripheral surfaces of the crank portions 45a and 45b (the upper edge of the eccentric shaft portion 49) are in contact with the upper surfaces of the telescopic-adjusting long holes 16a and 16a. In addition, in the locked state illustrated in FIG. 4B, no clearances are present between lower edges of outer peripheral surfaces of the crank portions 45a and 45b, and lower surfaces of the telescopic-adjusting long holes 16a and 16a. In other words, in the locked state illustrated in FIG. 4B, the lower edges of the outer peripheral surfaces of the crank portions 45a and 45b are in contact with the lower surfaces of the telescopic-adjusting long holes 16a and 16a.

That is, the clearance (distance) between the upper and lower edges of the outer peripheral surfaces of the crank portions 45a and 45b and the upper and lower surfaces of the telescopic-adjusting long holes 16a and 16a in the locked state are set to be smaller than the clearance (distance) between the upper and lower edges of the outer peripheral surfaces of the crank portions 45a and 45b and the upper and lower surfaces of the telescopic-adjusting long holes 16*a* and 16*a* in the unlocked state.

The embodiment adopts the configuration in which, in the unlocked state and the locked state, no clearances are present between the lower edges of the outer peripheral surfaces of the crank portions 45*a* and 45*b*, and the lower surfaces of the telescopic-adjusting long holes 16*a* and 16*a*. However, a configuration may also be adopted in which, in the unlocked state and the locked state, up-down-direction clearances are present between the lower edges of the outer peripheral surfaces of the crank portions 45*a* and 45*b*, and the lower surfaces of the telescopic-adjusting long holes 16*a* and 16*a*. Even in a case where the above-described configuration is adopted, in the locked state, as illustrated in FIG. 4B, no clearances are present between the upper and lower edges of the outer peripheral surfaces of the crank portions 45*a* and 45*b* and the upper and lower surfaces of the telescopic-adjusting long holes 16*a* and 16*a* (alternatively, clearances which are smaller than those in the locked state are present).

The other structures, actions, and effects are the same as those of the first embodiment.

Third Embodiment

A third embodiment of the present invention will be described with reference to FIGS. 5A and 5B. In the embodiment, as in the case of the adjusting rod 17*a* according to the first embodiment, a pair of non-circular portions 41*a* are provided in two positions of an adjusting rod 17*c* in an axial direction.

In the embodiment, a pair of non-circular resin portions 53 are externally fitted and fixed to two positions in the middle of the outer peripheral surface of the adjusting rod 17*c* in the axial direction so as to cover the two positions. The portions of the adjusting rod 17*c* to which the non-circular resin portions 53 are externally fitted and fixed are set as the non-circular portions 41*a*. In the embodiment, outer peripheral surfaces of the non-circular resin portions 53 have an elliptical shape in cross-section.

Figure 5A:
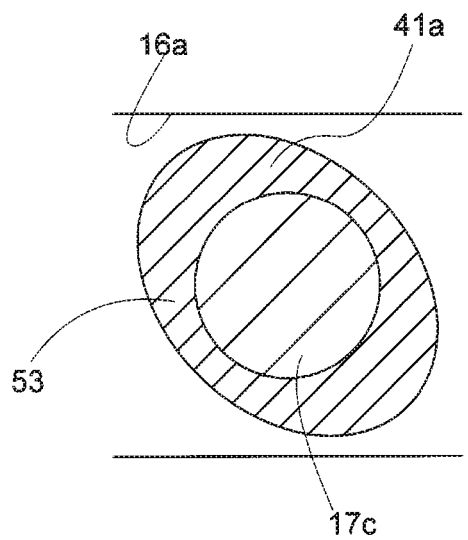
FIGS. 5A and 5B are diagrams illustrating a third embodiment of the present invention and corresponding to FIGS. 2A and 2B.
Figure 5B:
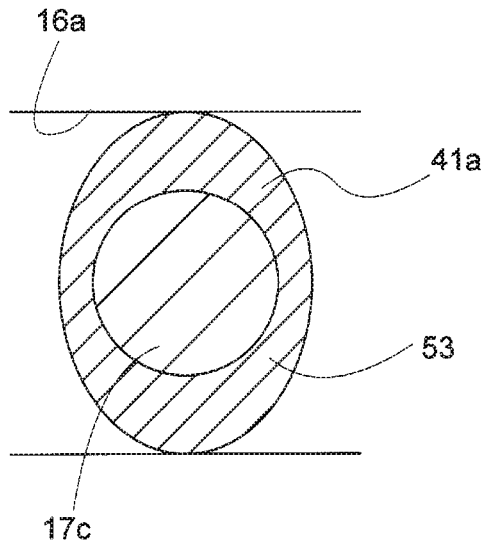

Specifically, in a state (unlocked state) illustrated in FIG. 5A where the position of the steering wheel 1 (refer to FIG. 12) can be adjusted, the adjusting rod 17*c* is disposed such that a major axis direction of the non-circular portions 41*a* matches a specific direction, the specific direction being inclined by 45° from a direction in which the telescopic-adjusting long holes 16*a* and 16*a* are disposed (the front-rear direction of the vehicle) toward a rotating direction (clockwise direction in FIGS. 5A and 5B) of the driving cam 26 (refer to FIGS. 1A and 1B) during transition from the unlocked state to a state (locked state) where the position of the steering wheel 1 can be maintained.

On the other hand, in the locked state, the cam device 28 is configured (the displacement of the driving cam 26 relative to the driven cam 27 is restricted) and the adjusting rod 17*c* is disposed such that a longitudinal direction of the non-circular portions 41*a* matches a direction (up-down direction) perpendicular to the direction (front-rear direction) in which the telescopic-adjusting long holes 16*a* and 16*a* are disposed.

Figure 6A:
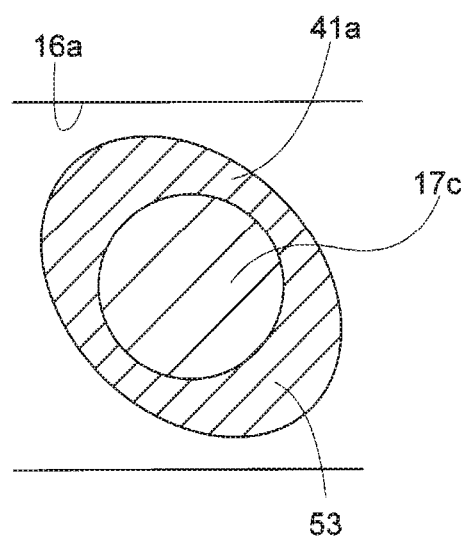
FIGS. 6A and 6B are diagrams illustrating another example of the relationship between a non-circular portion and a telescopic-adjusting long hole in the third embodiment and corresponding to FIGS. 2A and 2B.
Figure 6B:
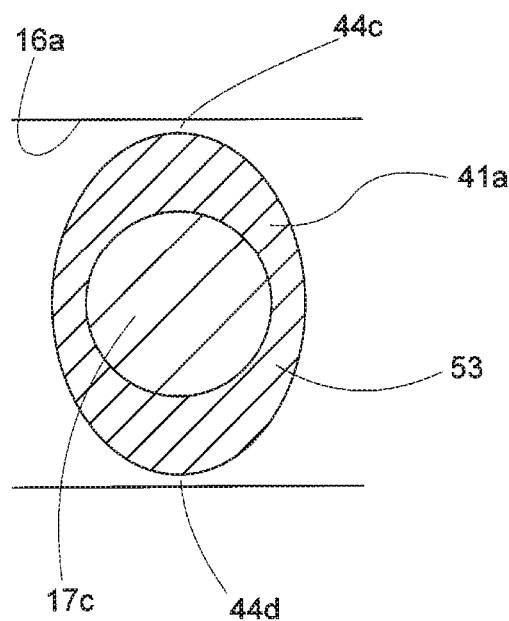

In the embodiment, in the locked state, upper and lower edges (opposite edges in the major axis direction) of the outer peripheral surfaces of the non-circular portions 41*a* are in contact with upper and lower surfaces of the telescopic-adjusting long holes 16*a* and 16*a*. In the locked state, a configuration may also be adopted in which up-down-direction clearances 44*c* and 44*d* illustrated in FIG. 6B are provided between the upper and lower edges (opposite edges in the major axis direction) of the outer peripheral surfaces of the non-circular portions 41*a* and the upper and lower surfaces of the telescopic-adjusting long holes 16*a* and 16*a*.

The other structures, actions, and effects are the same as those of the first embodiment.

Fourth Embodiment

A fourth embodiment of the present invention will be described with reference to FIGS. 7A and 7B. In the embodiment, as in the case of the adjusting rod 17*a* according to the first embodiment, a pair of non-circular portions 41*b* are provided in two positions of an adjusting rod 17*d* in an axial direction.

Specifically, in the embodiment, a pair of eccentric protrusions 54 and 54 are formed in two positions in the middle of the adjusting rod 17*d* in the axial direction, the two positions being distant from each other in the axial direction and being opposite to each other in a radial direction of the adjusting rod 17*d*.

Each of the eccentric protrusions 54 and 54 has a curvature, which is higher than those of outer peripheral surfaces of portions of the adjusting rod 17*d* where the eccentric protrusions 54 and 54 are provided, and has a central axis $O_{54}$ which is eccentric to a central axis $O_{17d}$ of the adjusting rod 17*d*.

The portion of the adjusting rod 17*d* where the eccentric protrusions 54 and 54 are provided is set as the non-circular portions 41*b* having a substantially elliptical shape in cross-section.

Figure 7A:
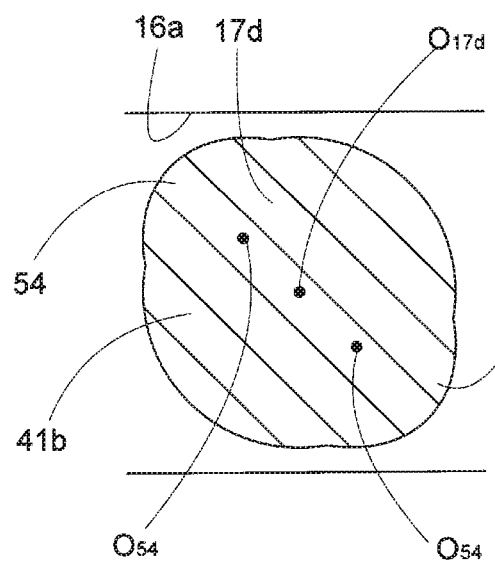
FIGS. 7A and 7B are diagrams illustrating a fourth embodiment of the present invention and corresponding to FIGS. 2A and 2B.

Specifically, in a state (unlocked state) illustrated in FIG. 7A where the position of the steering wheel 1 (refer to FIG. 12) can be adjusted, the adjusting rod 17*d* is disposed such that a major axis direction of the non-circular portions 41*b* (a direction in which the eccentric protrusions 54 and 54 are formed in the radial direction of the adjusting rod 17*d*) matches a specific direction, the specific direction being inclined by 45° from a direction in which the telescopic-adjusting long holes 16*a* and 16*a* are disposed {the front-rear direction, the left-right direction in FIG. 7A} toward a rotating direction (clockwise direction in FIGS. 7A and 7B) of the driving cam 26 (refer to FIGS. 1A and 1B) during transition from the unlocked state to a state (locked state) where the position of the steering wheel 1 can be maintained.

Figure 7B:
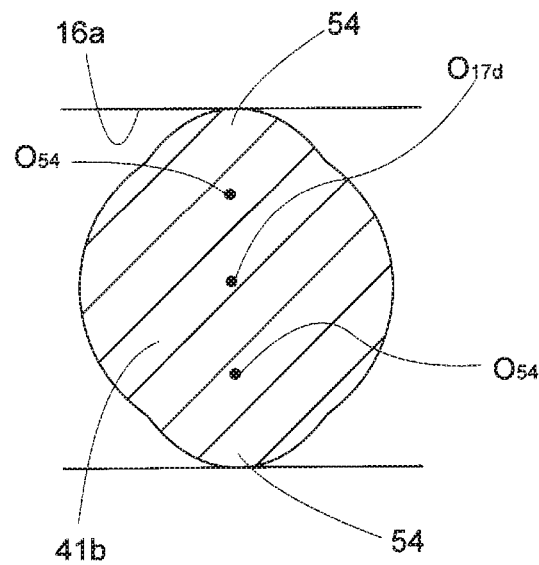

On the other hand, in the locked state illustrated in FIG. 7B, the cam device 28 is configured (the displacement of the driving cam 26 relative to the driven cam 27 is restricted) and the adjusting rod 17*d* is disposed such that a longitudinal direction of the non-circular portions 41*b* matches a direction (up-down direction) perpendicular to the direction (front-rear direction) in which the telescopic-adjusting long holes 16*a* and 16*a* are disposed. In the embodiment, the shapes of the eccentric protrusions 54 and 54 (the eccentricities with respect to the central axis of the adjusting rod 17*d*, the amounts of protruding) may also be different from each other. In addition, a structure where only one of the eccentric protrusions 54 and 54 is provided may also be adopted.

The other structures, actions, and effects are the same as those of the first embodiment.

Fifth Embodiment

A fifth embodiment of the present invention will be described with reference to FIGS. 8A and 8B. In the embodiment, as in the case of the adjusting rod 17*a* according to the first embodiment, a pair of non-circular portions 41c are provided in two positions of an adjusting rod 17e in an axial direction.

Specifically, in the embodiment, an eccentric protrusion 54a is formed in one position in a circumferential direction among two positions in the middle of the adjusting rod 17e in the axial direction, the two positions being distant from each other in the axial direction.

The eccentric protrusion 54a has a curvature, which is higher than that of an outer peripheral surface of a portion of the adjusting rod 17e where the eccentric protrusion 54a is provided (outer peripheral surface of a portion excluding the eccentric protrusion 54a), and has a central axis $O_{54a}$ which is eccentric to a central axis $O_{17e}$ of the adjusting rod 17e.

The portion of the adjusting rod 17e where the eccentric protrusion 54a is provided is set as each of the non-circular portions 41c.

Figure 8A:
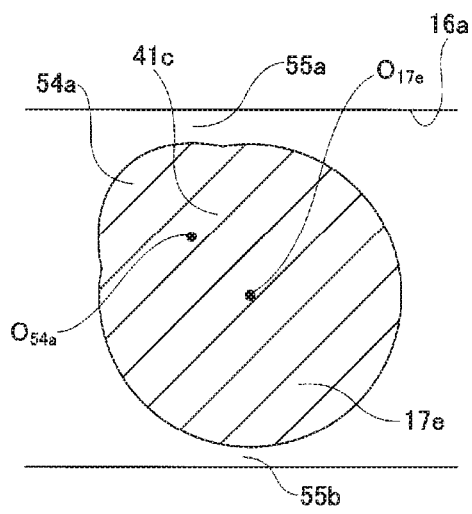
FIGS. 8A and 8B are diagrams illustrating a fifth embodiment of the present invention and corresponding to FIGS. 2A and 2B.

Specifically, in a state (unlocked state) illustrated in FIG. 8A where the position of the steering wheel 1 (refer to FIG. 12) can be adjusted, the adjusting rod 17e is disposed such that a direction in which the eccentric protrusion 54a is formed in the non-circular portions 41c matches a specific direction, the specific direction being inclined by 45° from a direction in which the telescopic-adjusting long holes 16a and 16a are disposed {the front-rear direction, the left-right direction in FIG. 8A} toward a rotating direction (clockwise direction in FIGS. 8A and 8B) of the driving cam 26 (refer to FIGS. 1A and 1B) during transition from the unlocked state to a state (locked state) where the position of the steering wheel 1 can be maintained.

Figure 8B:
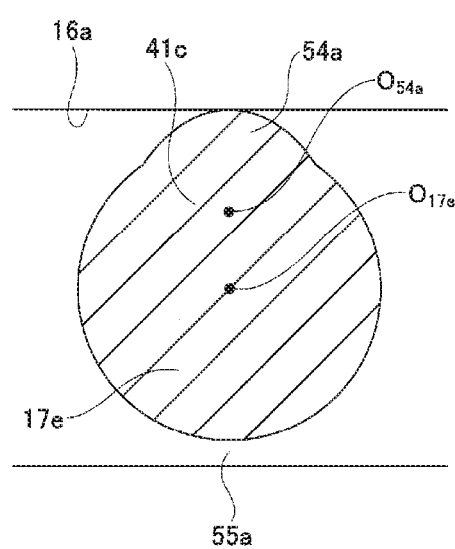

On the other hand, in the locked state illustrated in FIG. 8B, the cam device 28 is configured (the displacement of the driving cam 26 relative to the driven cam 27 is restricted) and the adjusting rod 17e is disposed such that the direction in which the eccentric protrusion 54a is formed in the non-circular portions 41c matches a direction (up-down direction in FIG. 8B) perpendicular to the direction (front-rear direction) in which the telescopic-adjusting long holes 16a and 16a are disposed.

In the embodiment, in the unlocked state, a pair of up-down-direction clearances 55a and 55b are present between upper and lower edges of an outer peripheral surface of each of the non-circular portions 41c and upper and lower surfaces of each of the telescopic-adjusting long holes 16a and 16a. On the other hand, in the locked state, the upper edges of the outer peripheral surfaces of the non-circular portions 41c are in contact with the upper surfaces of the telescopic-adjusting long holes 16a and 16a, and the up-down-direction clearances 55a are present between the lower edges of the outer peripheral surfaces of the non-circular portions 41c and the lower surfaces of the telescopic-adjusting long holes 16a and 16a.

In the embodiment, in the unlocked state, the up-down-direction clearances 55b are present between the lower edges of the outer peripheral surfaces of the non-circular portions 41c and the upper and lower surfaces of the telescopic-adjusting long holes 16a and 16a. A structure in which the up-down-direction clearances 55b are not provided may also be adopted.

The other structures, actions, and effects are the same as those of the first embodiment.

Sixth Embodiment

A sixth embodiment of the present invention will be described with reference to FIGS. 9A and 9B. In the embodiment, as in the case of the adjusting rod 17a according to the first embodiment, a pair of non-circular portions 41d are provided in two positions of an adjusting rod 17f in an axial direction.

Specifically, in the embodiment, an eccentric protrusion 54b is formed in one position in a circumferential direction among two positions in the middle of the adjusting rod 17f in the axial direction, the two positions being distant from each other in the axial direction.

The eccentric protrusion 54b has a curvature, which is higher than that of an outer peripheral surface of a portion of the adjusting rod 17f where the eccentric protrusion 54b is provided (portion excluding the eccentric protrusion 54b), and has a central axis $O_{54b}$ which is eccentric to a central axis $O_{17f}$ of the adjusting rod 17f.

The portion of the adjusting rod 17f where the eccentric protrusion 54b is provided is set as each of the non-circular portions 41d.

Figure 9A:
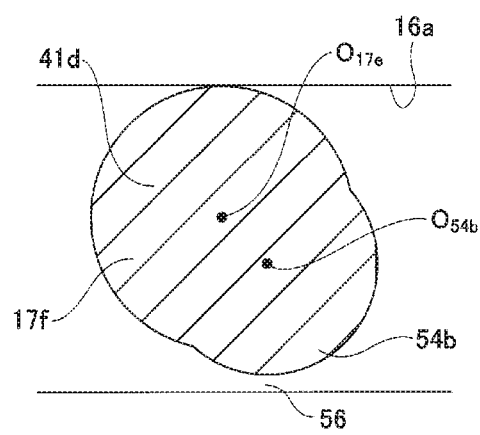
FIGS. 9A and 9B are diagrams illustrating a sixth embodiment of the present invention and corresponding to FIGS. 2A and 2B.

Specifically, in a state (unlocked state) illustrated in FIG. 9A where the position of the steering wheel 1 (refer to FIG. 12) can be adjusted, the adjusting rod 17f is disposed such that a direction in which the eccentric protrusion 54b is formed in the non-circular portions 41d matches a specific direction, the specific direction being inclined by 45° from a direction in which the telescopic-adjusting long holes 16a and 16a are disposed {the front-rear direction, the left-right direction in FIG. 9A} toward a rotating direction (clockwise direction in FIGS. 9A and 9B) of the driving cam 26 (refer to FIGS. 1A and 1B) during transition from the unlocked state to a state (locked state) where the position of the steering wheel 1 can be maintained.

Figure 9B:
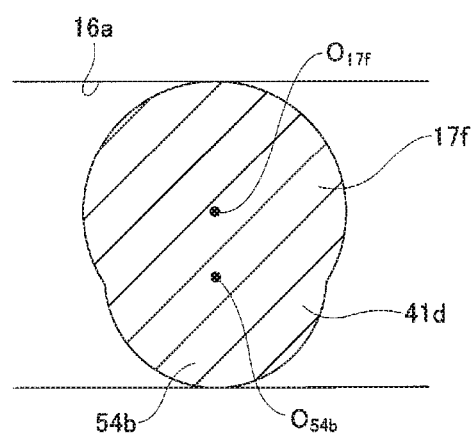

On the other hand, in the locked state illustrated in FIG. 9B, the cam device 28 is configured (the displacement of the driving cam 26 relative to the driven cam 27 is restricted) and the adjusting rod 17f is disposed such that the direction in which the eccentric protrusion 54b is formed in the non-circular portions 41d matches a direction (up-down direction in FIG. 9B) perpendicular to the direction in which the telescopic-adjusting long holes 16a and 16a are disposed.

In the embodiment, in the unlocked state, the upper edges of the outer peripheral surfaces of the non-circular portions 41d are in contact with the upper surfaces of the telescopic-adjusting long holes 16a and 16a, and up-down-direction clearances 56 are present between the lower edges of the outer peripheral surfaces of the non-circular portions 41d and the lower surfaces of the telescopic-adjusting long holes 16a and 16a. That is, in the embodiment, a structure (for example, the spring 59 in FIGS. 4A and 4B) for assisting a manipulation of adjusting the position of the steering wheel 1 in the up-down direction is not provided. Therefore, in the unlocked state, the outer column 18a and the displacement bracket 13a hang downward due to the gravity effect, and the upper edges of the outer peripheral surfaces of the non-circular portions 41d are in contact with the upper surfaces of the telescopic-adjusting long holes 16a and 16a.

On the other hand, in the locked state, the upper and lower edges of the outer peripheral surfaces of the non-circular portions 41d are in contact with the upper and lower surfaces of the telescopic-adjusting long holes 16a and 16a.

In the structure according to the embodiment having the above-described configuration, the outer column 18a and the displacement bracket and the displacement bracket 13a (refer to FIGS. 1A and 1B) hang downward due to the gravity effect, and the upper edges of the outer peripheral surfaces of the non-circular portions 41d are in contact with the upper surfaces of the telescopic-adjusting long holes 16a and 16a. However, during transition from the unlocked state illustrated in FIG. 9A to the locked state illustrated in FIG. 9B, the portions of the outer peripheral surfaces of the non-circular portions 41d, which are in contact with the upper surfaces of the telescopic-adjusting long holes 16a and 16a, are not eccentric to the central axis (rotation center) $O_{17f}$ of the adjusting rod 17f. Therefore, the contact portions are not displaced in the up-down direction. Accordingly, even when the adjusting rod 17f rotates, the outer column 18a and the displacement bracket 13a are not displaced in the up-down direction. As a result, a driver does not feel discomfort during transition from the unlocked state to the locked state.

The other structures, actions, and effects are the same as those of the first embodiment.

Seventh Embodiment

A seventh embodiment of the present invention will be described with reference to FIGS. 10A and 10B. In this embodiment, for example, in order to assist a manipulation of adjusting the position of the steering wheel 1 (refer to FIG. 12) in the up-down direction, a structure (for example, the spring 59 in FIGS. 4A and 4B) having a mechanism for biasing the outer column 18a and the displacement bracket 13a (refer to FIGS. 1A and 1B) is adopted. In the embodiment, as in the case of the adjusting rod 17a according to the first embodiment, a pair of non-circular portions 41e are provided in two positions of an adjusting rod 17g in an axial direction.

Specifically, in the embodiment, an eccentric protrusion 54c is formed in one position in a circumferential direction among two positions in the middle of the adjusting rod 17g in the axial direction, the two positions being distant from each other in the axial direction.

The eccentric protrusion 54c has a curvature, which is higher than that of an outer peripheral surface of a portion of the adjusting rod 17g where the eccentric protrusion 54c is provided (portion excluding the eccentric protrusion 54c), and has a central axis $O_{54c}$ which is eccentric to a central axis $O_{17g}$ of the adjusting rod 17g.

The portion of the adjusting rod 17g where the eccentric protrusion 54c is provided is set as each of the non-circular portions 41e.

Figure 10A:
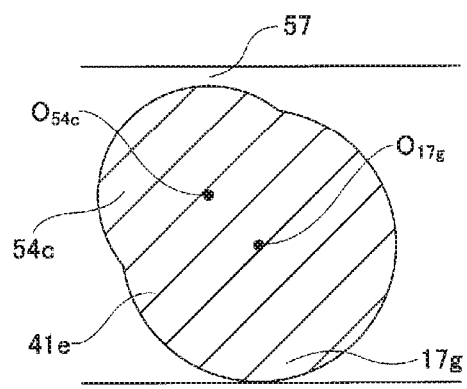
FIGS. 10A and 10B are diagrams illustrating a seventh embodiment of the present invention and corresponding to FIGS. 2A and 2B.

Specifically, in a state (unlocked state) illustrated in FIG. 10A where the position of the steering wheel 1 can be adjusted, the adjusting rod 17g is disposed such that a direction in which the eccentric protrusion 54c is formed in the non-circular portions 41e matches a specific direction, the specific direction being inclined by 45° from a direction in which the telescopic-adjusting long holes 16a and 16a are disposed {the front-rear direction, the left-right direction in FIG. 10A} toward a rotating direction (clockwise direction in FIGS. 10A and 10B) of the driving cam 26 (refer to FIGS. 1A and 1B) during transition from the unlocked state to a state (locked state) where the position of the steering wheel 1 can be maintained.

Figure 10B:
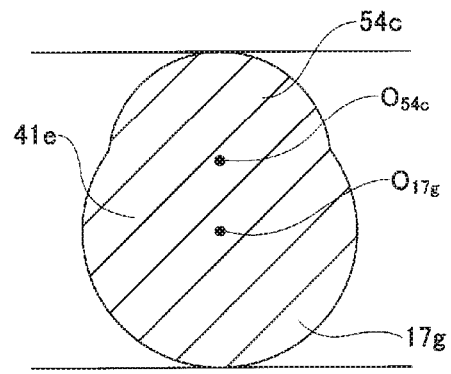

On the other hand, in the locked state illustrated in FIG. 10B, the cam device 28 is configured (the displacement of the driving cam 26 relative to the driven cam 27 is restricted) and the adjusting rod 17g is disposed such that the direction in which the eccentric protrusion 54c is formed in the non-circular portions 41e matches a direction (up-down direction) perpendicular to the direction (front-rear direction) in which the telescopic-adjusting long holes 16a and 16a are disposed.

In the embodiment, in the unlocked state, the lower edges of the outer peripheral surfaces of the non-circular portions 41e are in contact with the lower surfaces of the telescopic-adjusting long holes 16a and 16a, and up-down-direction clearances 57 are present between the upper edges of the outer peripheral surfaces of the non-circular portions 41e and the upper surfaces of the telescopic-adjusting long holes 16a and 16a. That is, in the embodiment, a structure (for example, the spring 59 in FIGS. 4A and 4B) for assisting a manipulation of adjusting the position of the steering wheel 1 in the up-down direction is provided. Therefore, in the unlocked state, the outer column 18a and the displacement bracket 13a are pressed upward, and the lower edges of the outer peripheral surfaces of the non-circular portions 41e are in contact with the lower surfaces of the telescopic-adjusting long holes 16a and 16a.

On the other hand, in the locked state, the upper and lower edges of the outer peripheral surfaces of the non-circular portions 41e are in contact with the upper and lower surfaces of the telescopic-adjusting long holes 16a and 16a.

In the structure according to the embodiment having the above-described configuration, the outer column 18a and the displacement bracket and the displacement bracket 13a (refer to FIGS. 1A and 1B) are pressed upward, and the lower edges of the outer peripheral surfaces of the non-circular portions 41e are in contact with the lower surfaces of the telescopic-adjusting long holes 16a and 16a. However, during transition from the unlocked state illustrated in FIG. 10A to the locked state illustrated in FIG. 10B, the portions of the outer peripheral surfaces of the non-circular portions 41e, which are in contact with the lower surfaces of the telescopic-adjusting long holes 16a and 16a, are not eccentric to the central axis (rotation center) $O_{17g}$ of the adjusting rod 17g. Therefore, the contact portions are not displaced in the up-down direction. Accordingly, even when the adjusting rod 17g rotates, the outer column 18a and the displacement bracket 13a are not displaced in the up-down direction. As a result, a driver does not feel discomfort during transition from the unlocked state to the locked state.

The other structures, actions, and effects are the same as those of the first embodiment.

Eighth Embodiment

An eighth embodiment of the present invention will be described with reference to FIGS. 11A and 11B. An adjusting rod 17i constituting the position-adjusting device for a steering wheel according to the embodiment includes a pair of non-circular portions 41f in two positions in an axial direction.

Figure 11A:
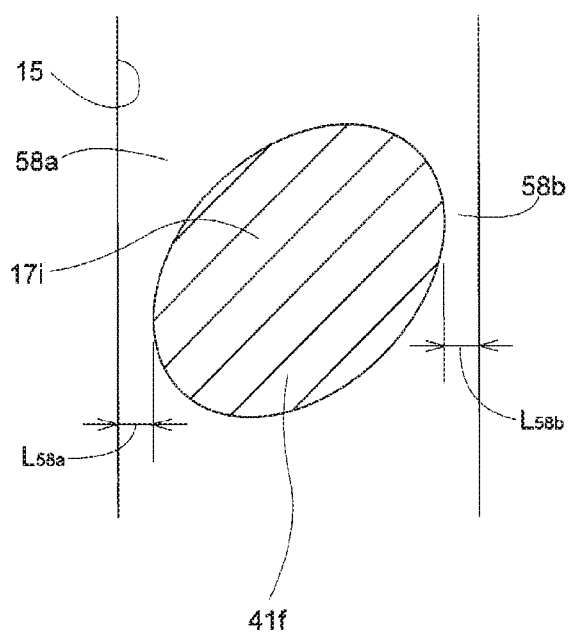
FIGS. 11A and 11B are diagrams illustrating an eighth embodiment of the present invention and corresponding to FIGS. 2A and 2B.
Figure 11B:
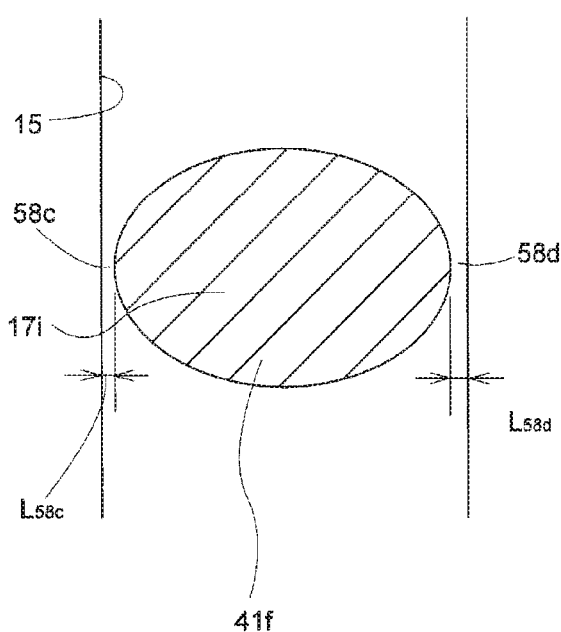

Specifically, a pair of non-circular portions 41f, which correspond to the clearance adjusting portion of the present invention and have an elliptical shape in cross-section illustrated in FIGS. 11A and 11B, are provided in two positions which are the opposite end-side portions of the adjusting rod 17i in the axial direction. In the embodiment, the non-circular portions 41f are disposed inside of a pair of tilt-adjusting long holes 15 and 15 which are formed in support plate portions 22 and 22 constituting a fixing bracket 14 (refer to FIGS. 1A and 1B). In addition, in the embodiment, the non-circular portions 41f are disposed inside of a pair of telescopic-adjusting long holes 16a and 16a which are formed in held plate portion 21a and 21a constituting a displacement bracket 13a (refer to FIGS. 1A and 1B). That is, in the embodiment, the portions of the adjusting rod 17i which are disposed inside of the telescopic-adjusting long holes 16a and 16a have a circular shape in cross-section.

In the embodiment, in a state (unlocked state) illustrated in FIG. 11A where the position of the steering wheel 1 (refer to FIG. 12) can be adjusted, the adjusting rod 17i is disposed such that a major axis direction of the non-circular portions 41f matches a specific direction, the specific direction being inclined by 45° from a direction in which the tilt-adjusting long holes 15 and 15 are disposed (the up-down direction in FIGS. 11A and 11B, the position adjusting direction of the present invention) toward a rotating direction (clockwise direction in FIGS. 11A and 11B) of the driving cam 26 (refer to FIGS. 1A and 1B) during transition from the unlocked state to a state (locked state) where the position of the steering wheel 1 can be maintained.

In addition, in the embodiment, in a state (locked state) illustrated in FIG. 11B where the position of the steering wheel 1 can be maintained, the cam device 28 is configured (the displacement of the driving cam 26 relative to the driven cam 27 is restricted) and the adjusting rod 17i is disposed such that the major axis direction of the non-circular portions 41f matches a direction (front-rear direction) perpendicular to the direction in which the tilt-adjusting long hole 15 and 15 are disposed. That is, the driving cam 26 and the adjusting rod 17i rotate by 45° about the central axes thereof, respectively, along with the pivoting (rotation) of the adjusting lever 23 (refer to FIGS. 1A and 1B) during the transition from the unlocked state to the locked state. As a result, a protrusion constituting the driving cam surface of the driving cam 26 runs onto (faces) a protrusion constituting the driven cam surface of the driven cam 27, and the dimension of the cam device 28 in the axial direction expands. In addition, along with the rotation of the adjusting rod 17i, in the tilt-adjusting long holes 15 and 15, the non-circular portions 41f are transitioned from a state illustrated in FIG. 11A to a state FIG. 11B (rotates about 45° in the clockwise direction in FIGS. 11A and 11B). In the unlocked state and the locked state, the position relationship between the non-circular portions 41f and the tilt-adjusting long holes 15 and 15 is not limited to the configuration illustrated in FIGS. 11A and 11B. For example, the major axis direction of the non-circular portions 41f may rotate by 45° in the counterclockwise direction from the state illustrated in FIGS. 11A and 11B.

In addition, in the unlocked state, a pair of front-rear-direction clearance 58a and 58b having dimensions of $L58_a$ and $L58_b$ are present between front and rear edges of each of the outer peripheral surfaces of the non-circular portions 41f and front and rear surfaces of each of the tilt-adjusting long holes 15 and 15.

On the other hand, in the locked state, a pair of front-rear-direction clearances 58c and 58d having dimensions of $L58_c$ and $L58_d$ are present between the front and rear edges (opposite edges in the major axis direction) of each of the outer peripheral surfaces of the non-circular portions 41f and the front and rear surfaces of each of the tilt-adjusting long holes 15 and 15.

$L_{58c}+L_{58d}$, which is the sum of the dimensions of the front-rear-direction clearance 58c and 58d in the locked state, is less than $L_{55a}+L_{55b}$ which is the sum of the dimensions of the up-down-direction clearances 58a and 58b in the unlocked state $(L_{58c}+L_{58d}<L_{55a}+L_{55b})$.

In the embodiment, even in the locked state, the front-rear-direction clearances 58c and 58d having the above-described configuration are present $(L_{58c}>0, L_{58d}>0)$. However, a configuration in which the dimensions of the front-rear-direction clearances 58c, 58c are zero may also be adopted. That is, in the locked state, a configuration may be adopted in which opposite edges of the outer peripheral surface of the non-circular portions 41f in a minor axis direction {opposite edges in the left-right direction of FIG. 11B} are in contact with the front and rear surfaces of the tilt-adjusting long holes 15 and 15. In addition, in the embodiment, the sizes of the front-rear-direction clearances 58a and 58b are the same. However, the sizes of the front-rear-direction clearances 58a and 58b may be different from each other.

In the position-adjusting device for a steering wheel according to the embodiment having the above-described configuration, the up-down position of a steering wheel can be smoothly adjusted in an unlocked state and the feeling of support rigidity of the steering wheel in the front-rear direction in the locked state can be improved.

That is, in the embodiment, the sum $(L_{58c}+L_{58d})$ of the dimensions of the front-rear-direction clearances 58c and 58d, which are present between the opposite edges in the front-rear direction of each of the outer peripheral surfaces of the non-circular portions 41f and the front and rear surfaces of each of the tilt-adjusting long holes 15 and 15 in the locked state, is less than the sum $(L_{58a}+L_{58b})$ of the dimensions of the front-rear-direction clearances 58a and 58b, which are present between the opposite edges in the front-rear direction of each of the outer peripheral surfaces of the non-circular portions 41f and the front and rear surfaces of each of the tilt-adjusting long holes 15 and 15 in the unlocked state, $(L_{58c}+L_{58d}<L_{55a}+L_{55b})$. Therefore, in the unlocked state, the adjusting rod 17a can be smoothly displaced in the up-down direction in the tilt-adjusting long holes 15 and based on the presence of the front-rear-direction clearances 58a and 58b. On the other hand, in the locked state, the front-rear-direction clearances 58c and 58d are smaller than the front-rear-direction clearances 58a and 58b. Therefore, the distance in which the adjusting rod 17a can be displaced in the front-rear direction in the tilt-adjusting long holes 15 and 15 can be reduced. As a result, the feeling of support rigidity of the steering wheel 1 in the front-rear direction is improved, and discomfort felt by a driver can be reduced (or eliminated).

In the embodiment, the portions of the adjusting rod 17i which are disposed inside of the telescopic-adjusting long holes 16a and 16a can be made to be non-circular portions (not illustrated) having an elliptical shape, for example, a shape obtained by rotating the non-circular portions 41f by 90° in the circumferential direction. In a case where the above-described configuration is adopted, the non-circular portions are disposed inside of the telescopic-adjusting long holes 16a and 16a as in the case of the first embodiment. By adopting the above-described configuration, as in the first embodiment, the feeling of support rigidity of the steering wheel 1 in the up-down direction is improved, and discomfort felt by a driver can be reduced (or eliminated). That is, by simultaneously adopting the structure in which the non-circular portions are disposed inside of the telescopic-adjusting long holes 16a and 16a and the structure in which the non-circular portions 41f are disposed inside of the tilt-adjusting long holes 15 and 15, the feeling of support rigidity of the steering wheel 1 in the up-down direction and the front-rear direction can be improved.

In addition, although not illustrated in the drawings, any one of the structures according to the embodiments may also be adopted as the non-circular portion 41f. In addition, the clearance adjusting portions such as the crank portions 45a and 45b in the second embodiment may also be adopted instead of the non-circular portions 41f.

The other structures, actions, and effects are the same as those of the first embodiment.

INDUSTRIAL APPLICABILITY

In order to practice the present invention, the structure of the clearance adjusting portion is not limited to the structure according to any one of the embodiments. That is, various structures can be adopted as long as the displacement in a direction perpendicular to the position adjusting direction in a state where the position of the steering wheel can be maintained can be made to be less than the displacement in the direction perpendicular to the position adjusting direction in a state where the position of the steering wheel can be adjusted. In other words, various structures can be adopted as the structure of the clearance adjusting portion as long as the clearance in the direction perpendicular to the position adjusting direction which is present between the clearance adjusting portion and the inner surface of the adjusting long hole (the telescopic-adjusting long hole or the tilt-adjusting long hole) in a state where the position of the steering wheel can be maintained, can be made to be smaller than the clearance in the direction in a state where the position of the steering wheel can be adjusted.

In addition, the structures of the respective embodiments can be appropriately combined to practice the present invention. That is, in a case where the structure according to any one of the first to seventh embodiments and the structure according to the eighth embodiment are combined to practice the present invention, the feeling of support rigidity of the steering wheel in the up-down direction and the front-rear direction can be improved.

Further, a structure in which one of the non-circular portions 41 according to the first embodiment is replaced with the non-circular portion 41f according to the eighth embodiment may also be adopted. That is, in this structure, the first clearance adjusting portion which is formed in the first end-side portion of the adjusting rod in the axial direction is disposed inside of the telescopic-adjusting long holes. As a result, the clearances (the sum of the dimensions of the clearances) in the up-down direction which are present between the first clearance adjusting portion and the opposite surfaces of the telescopic-adjusting long hole in the up-down direction in the locked state can be made to be smaller than the clearances in the up-down direction in the unlocked state. On the other hand, the second clearance adjusting portion which is formed in the second end-side portion of the adjusting rod in the axial direction is disposed inside of the tilt-adjusting long hole. As a result, the clearances (the sum of the dimensions of the clearances) in the front-rear direction which are present between the second clearance adjusting portion and the opposite surfaces of the tilt-adjusting long hole in the front-rear direction in the locked state can be made to be smaller than the clearances in the front-rear direction in the unlocked state. By adopting the above-described structure, the feeling of support rigidity of the steering wheel in the up-down direction and the front-rear direction in the locked state can be improved by the non-circular portions provided in the two positions of the adjusting rod.

In addition, the non-circular portion according to the present invention may include a straight portion in the outer diameter thereof or, for example, may be a rectangular shape.

Further, the expanding-contracting mechanism for expanding or contracting the gap between the pressing portions is not limited to the cam device according to any one of the embodiments or, for example, may be a fastening mechanism using a screw.

The present application is based on Japanese Patent Application No. 2015-216127 filed on Nov. 2, 2015, the content of which is incorporated herein by reference.

DESCRIPTION OF REFERENCE NUMERALS AND SIGNS

1: steering wheel
2: steering gear unit
3: input shaft
4: tie rod
5: steering shaft
6, 6a: steering column
7: universal joint
8: intermediate shaft
9: universal joint
10: housing
11: vehicle body
12: tilt shaft
13, 13a: displacement bracket
14: fixing bracket
15: tilt-adjusting long hole
16, 16a: telescopic-adjusting long hole
17, 17a, 17b, 17c, 17d, 17e, 17f, 17g, 17i: adjusting rod
18, 18a: outer column
19, 19a: inner column
20, 20a: slit
21, 21a: held plate portion
22: support plate portion
23: adjusting lever
24, 24a, 24b: nut
25, 25a, 25b: thrust bearing
26, 26a: driving cam
27, 27a: driven cam
28, 28a: cam device
29a, 29b: up-down-direction clearance
30: electric motor
31: outer shaft
32: inner shaft
33: protrusion portion
34: bottom portion
35: mounting plate portion
36: release capsule
37, 37a: head portion
38: pressing plate
39: engagement protrusion
40: driving engagement protrusion
41, 41a, 41b, 41c, 41d, 41e, 41f: non-circular portion
42: cylindrical surface portion
43a, 43b: up-down-direction clearance
44a, 44b, 44c, 44d: up-down-direction clearance
45a, 45b: crank portion
46: male screw portion
47: first shaft portion
48: first continuously inclined portion
49: eccentric shaft portion
50: second continuously inclined portion
51: second shaft portion
52: up-down-direction clearance
53: non-circular resin portion
54, 54a, 54b, 54c: eccentric protrusion
55a, 55b: up-down-direction clearance
56: up-down-direction clearance
57: up-down-direction clearance
58a, 58b, 58c, 58d: front-rear-direction clearance
59: spring

The invention claimed is:

1. A position-adjusting device for a steering wheel comprising:
   a steering column that is provided around a steering shaft having an end portion, to which a steering wheel is fixed, and rotatably supports the steering shaft;
   a displacement bracket that is fixed to a part of the steering column;
   a first through hole that is provided in the displacement bracket while penetrating through the displacement bracket in a width direction;
   a fixing bracket that includes a pair of support plate portions and is fixed to a vehicle body side, the support plate portions being provided to hold the displacement bracket between opposite sides thereof in the width direction;
   a pair of second through holes that are provided in the support plate portions, respectively;
   an adjusting rod that is provided while being inserted into the first through hole and the second through holes in the width direction;
   a pair of pressing portions that are provided in portions protruding from outer surfaces of the support plate portions in opposite end portions of the adjusting rod; and
   an expanding-contracting mechanism that expands or contracts a gap between the pressing portions;
   wherein at least either the first through hole or each of the second through holes is an adjusting long hole that is long in a position adjusting direction in which a position of the steering wheel is adjustable,
   when the expanding-contracting mechanism expands or contracts, the adjusting rod rotates,
   the adjusting rod has a clearance adjusting portion,
   the clearance adjusting portion is disposed inside of the adjusting long hole, and
   in a state where the position of the steering wheel is maintained, a clearance between an outer peripheral surface of the clearance adjusting portion and an inner surface of the adjusting long hole in a direction perpendicular to the position adjusting direction is less than a clearance between the outer peripheral surface of the clearance adjusting portion and the inner surface of the adjusting long hole in the direction perpendicular to the position adjusting direction in a state where the position of the steering wheel is adjustable, wherein
   the clearance adjusting portion is formed of a non-circular portion having a non-circular sectional shape, and
   the non-circular portion is formed of a resin portion that is externally fitted and fixed to an outer peripheral surface of the adjusting rod.

2. The position-adjusting device for a steering wheel according to claim 1, wherein:
   the position-adjusting device has a telescopic function for adjusting a front-rear position of the steering wheel;
   the first through hole is a long hole that is long in a front-rear direction; and
   the adjusting long hole is the first through hole.

3. The position-adjusting device for a steering wheel according to claim 1, wherein:
   the position-adjusting device has a tilt function for adjusting an up-down position of the steering wheel;
   each of the second through holes is a long hole that is long in an up-down direction; and
   the adjusting long hole is each of the second through holes.

4. The position-adjusting device for a steering wheel according to claim 1, wherein
   in the state where the position of the steering wheel is maintained, in a cross-sectional shape of the non-circular portion on a plane perpendicular to an axial direction of the adjusting rod, a dimension in the position adjusting direction is less than a dimension in the direction perpendicular to the position adjusting direction.

5. The position-adjusting device for a steering wheel according to claim 1, wherein
   the cross-sectional shape of the non-circular portion on the plane perpendicular to the axial direction of the adjusting rod is elliptical.

6. A position-adjusting device for a steering wheel comprising:
   a steering column that is provided around a steering shaft having an end portion, to which a steering wheel is fixed, and rotatably supports the steering shaft;
   a displacement bracket that is fixed to a part of the steering column;
   a first through hole that is provided in the displacement bracket while penetrating through the displacement bracket in a width direction;
   a fixing bracket that includes a pair of support plate portions and is fixed to a vehicle body side, the support plate portions being provided to hold the displacement bracket between opposite sides thereof in the width direction;
   a pair of second through holes that are provided in the support plate portions, respectively;
   an adjusting rod that is provided while being inserted into the first through hole and the second through holes in the width direction;
   a pair of pressing portions that are provided in portions protruding from outer surfaces of the support plate portions in opposite end portions of the adjusting rod; and
   an expanding-contracting mechanism that expands or contracts a gap between the pressing portions;
   wherein at least either the first through hole or each of the second through holes is an adjusting long hole that is long in a position adjusting direction in which a position of the steering wheel is adjustable,
   when the expanding-contracting mechanism expands or contracts, the adjusting rod rotates,
   the adjusting rod has a clearance adjusting portion,
   the clearance adjusting portion is disposed inside of the adjusting long hole, and
   in a state where the position of the steering wheel is maintained, a clearance between an outer peripheral surface of the clearance adjusting portion and an inner surface of the adjusting long hole in a direction perpendicular to the position adjusting direction is less than a clearance between the outer peripheral surface of the clearance adjusting portion and the inner surface of the adjusting long hole in the direction perpendicular to the position adjusting direction in a state where the position of the steering wheel is adjustable, wherein:
   the clearance adjusting portion is formed of a non-circular portion having a non-circular sectional shape,
   a protrusion that protrudes radially outward is formed in the middle of the adjusting rod in an axial direction;
   a portion of the adjusting rod that matches the protrusion in the axial direction is the non-circular portion; and
   a cross-sectional shape of an outer peripheral surface of the protrusion on a plane perpendicular to a central axis of the adjusting rod is an arc shape having a central axis that is eccentric to the central axis of the adjusting rod.

7. A position-adjusting device for a steering wheel comprising:

a steering column that is provided around a steering shaft having an end portion, to which a steering wheel is fixed, and rotatably supports the steering shaft;

a displacement bracket that is fixed to a part of the steering column;

a first through hole that is provided in the displacement bracket while penetrating through the displacement bracket in a width direction;

a fixing bracket that includes a pair of support plate portions and is fixed to a vehicle body side, the support plate portions being provided to hold the displacement bracket between opposite sides thereof in the width direction;

a pair of second through holes that are provided in the support plate portions, respectively;

an adjusting rod that is provided while being inserted into the first through hole and the second through holes in the width direction;

a pair of pressing portions that are provided in portions protruding from outer surfaces of the support plate portions in opposite end portions of the adjusting rod; and an expanding-contracting mechanism that expands or contracts a gap between the pressing portions;

wherein at least either the first through hole or each of the second through holes is an adjusting long hole that is long in a position adjusting direction in which a position of the steering wheel is adjustable, when the expanding-contracting mechanism expands or contracts, the adjusting rod rotates, the adjusting rod has a clearance adjusting portion, the clearance adjusting portion is disposed inside of the adjusting long hole, and in a state where the position of the steering wheel is maintained, a clearance between an outer peripheral surface of the clearance adjusting portion and an inner surface of the adjusting long hole in a direction perpendicular to the position adjusting direction is less than a clearance between the outer peripheral surface of the clearance adjusting portion and the inner surface of the adjusting long hole in the direction perpendicular to the position adjusting direction in a state where the position of the steering wheel is adjustable, wherein the clearance adjusting portion is formed of a crank portion including an eccentric shaft portion that is eccentric to a rotation center of the adjusting rod.

* * * * *